US012627350B2

(12) United States Patent
Harrison et al.

(10) Patent No.: US 12,627,350 B2
(45) Date of Patent: May 12, 2026

(54) DYNAMIC PUCCH REPETITION VIA PERIODIC CSI

(71) Applicant: Telefonaktiebolaget LM Ericsson (publ), Stockholm (SE)

(72) Inventors: Robert Mark Harrison, Grapevine, TX (US); Shiwei Gao, Nepean (CA); Siva Muruganathan, Stittsville (CA); Yufei Blankenship, Kildeer, IL (US); Zhipeng Lin, Nanjing Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 18/285,296

(22) PCT Filed: Apr. 1, 2022

(86) PCT No.: PCT/IB2022/053079
§ 371 (c)(1),
(2) Date: Oct. 2, 2023

(87) PCT Pub. No.: WO2022/208472
PCT Pub. Date: Oct. 6, 2022

(65) Prior Publication Data
US 2026/0031869 A1      Jan. 29, 2026

(30) Foreign Application Priority Data
Apr. 2, 2021    (WO) ................ PCT/CN2021/085183

(51) Int. Cl.
*H04W 24/10*        (2009.01)
*H04B 7/06*         (2006.01)
(Continued)

(52) U.S. Cl.
CPC ......... *H04B 7/0626* (2013.01); *H04L 1/1812* (2013.01); *H04W 24/10* (2013.01); *H04W 72/231* (2023.01); *H04W 80/02* (2013.01)

(58) Field of Classification Search
CPC .. H04B 7/0626; H04W 72/231; H04W 24/10; H04W 80/02; H04L 1/1812
(Continued)

(56) References Cited

U.S. PATENT DOCUMENTS

2022/0030606 A1*    1/2022    Xiong ............... H04W 72/1268

FOREIGN PATENT DOCUMENTS

WO          2022060532 A1       3/2022

OTHER PUBLICATIONS

3GPP, "3rd Generation Partnership Project; Technical Specification Group Radio Access Network; NR; Physical layer procedures for control (Release 16)", 3GPP TS 38.213 V16.4.0, Dec. 2020, 1-181.
(Continued)

*Primary Examiner* — Christopher R Crompton
(74) *Attorney, Agent, or Firm* — Murphy, Bilak & Homiller, PLLC

(57) ABSTRACT

Techniques for reporting Channel State Information. CSI. An example method, implemented in a wireless device, comprises the steps of receiving (1 110) signaling identifying a plurality of time instants in which the wireless device may transmit distinct CSI reports, receiving (1120) signaling identifying a set of one or more resources to be used to transmit a physical channel carrying CSI reports, and receiving (1130) control signaling that identifies a resource in the set of resources, where the control signaling indicates a repetition factor for repetitively transmitting a CSI report, either by association with the resource identified by the control signaling or by a distinct indicator included in the control signaling. The example method further comprises
(Continued)

(A)

(B)

transmitting (1140) the CSI report on the identified resource, according to the repetition factor and in a time instant of the plurality of time instants.

19 Claims, 19 Drawing Sheets

(51) Int. Cl.
H04L 1/1812 (2023.01)
H04W 72/231 (2023.01)
H04W 80/02 (2009.01)

(58) Field of Classification Search
USPC ......................................................... 370/329
See application file for complete search history.

(56) References Cited

OTHER PUBLICATIONS

3GPP, "3rd Generation Partnership Project; Technical Specification Group Radio Access Network; NR; Physical layer procedures for data (Release 16)", 3GPP TS 38.214 V16.4.0, Dec. 2020, 1-169.

3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, 1-932.

Unknown, Author, "Discussions on PUCCH enhancements", 3GPP TSG RAN WG1 #104-e R1-2100747 e-Meeting, InterDigital Inc., Jan. 25-Feb. 5, 2021, 1-5.

Unknown, Author, "Dynamic PUCCH repetition factor indication", 3GPP TSG RAN WG1 #104-e R1-2101548, e-Meeting, Sharp, Jan. 25-Feb. 5, 2021, 1-3.

Unknown, Author, "Enhancements on Multi-TRP for PDCCH, PUCCH and PUSCH", 3GPP TSG RAN WG1 #104-e R1-2100274 e-Meeting, Lenovo, Motorola Mobility, Jan. 25-Feb. 5, 2021, 1-17.

Unknown, Author, "FL summary of PUCCH coverage enhancement", 3GPP TSG RAN WG1 #104-e R1-2101813 e-Meeting, Moderator (Qualcomm), Jan. 25-Feb. 5, 2021, 1-7.

Unknown, Author, "PUCCH coverage enhancements", 3GPP TSG-RAN WG1 Meeting #104e, R1-2101480 e-Meeting, Qualcomm Incorporated, Jan. 25-Feb. 5, 2021, 1-4.

* cited by examiner

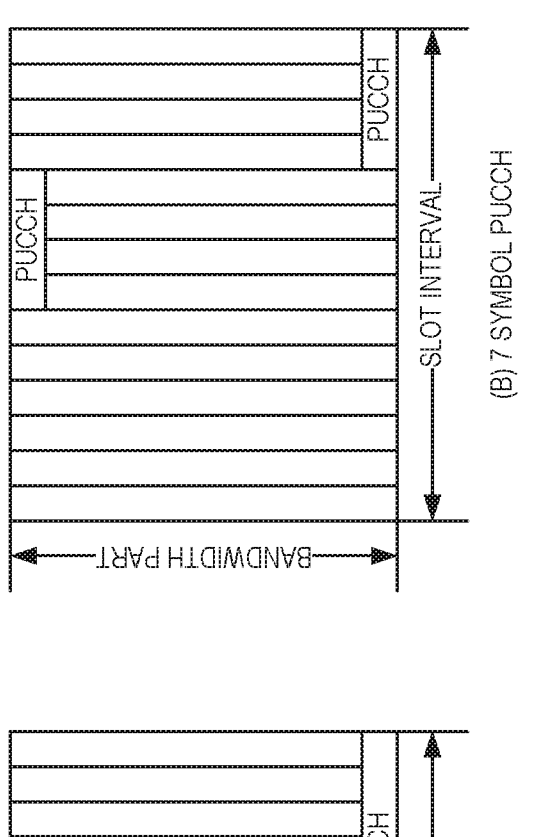
(B) 7 SYMBOL PUCCH
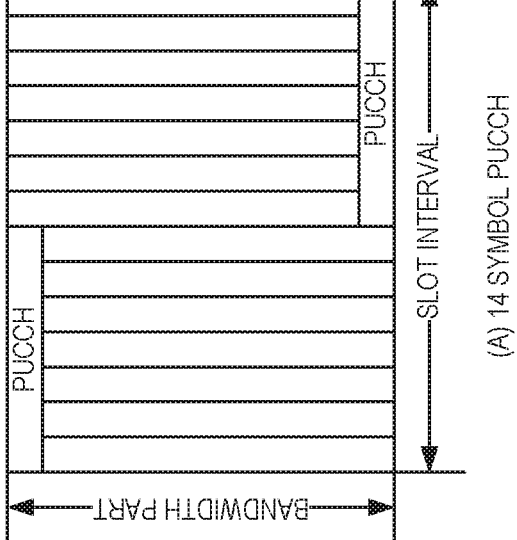
(A) 14 SYMBOL PUCCH
*FIG. 4*

| Table 9.2.3-2: Mapping of PUCCH resource indication field values to a PUCCH resource in a PUCCH resource set with maximum 8 PUCCH resources | | | | |
| --- | --- | --- | --- | --- |
| PUCCH resource indicator | | | PUCCH resource for slot n+k | PUCCH resource for periodic reporting |
| 1 bit | 2 bits | 3 bits | | |
| '0' | '00' | '000' | 1st PUCCH resource provided by *pucch-ResourceId* obtained from the 1st value of *resourceList* | 1st PUCCH resource provided by *pucch-ResourceId* obtained from the 1st value of *resourceListCSI* |
| '1' | '01' | '001' | 2nd PUCCH resource provided by *pucch-ResourceId* obtained from the 2nd value of *resourceList* | 2nd PUCCH resource provided by *pucch-ResourceId* obtained from the 2nd value of *resourceListCSI* |
| | '10' | '010' | 3rd PUCCH resource provided by *pucch-ResourceId* obtained from the 3rd value of *resourceList* | 3rd PUCCH resource provided by *pucch-ResourceId* obtained from the 3rd value of *resourceListCSI* |
| | '11' | '011' | 4th PUCCH resource provided by *pucch-ResourceId* obtained from the 4th value of *resourceList* | 4th PUCCH resource provided by *pucch-ResourceId* obtained from the 4th value of *resourceListCSI* |
| | | '100' | 5th PUCCH resource provided by *pucch-ResourceId* obtained from the 5th value of *resourceList* | 5th PUCCH resource provided by *pucch-ResourceId* obtained from the 5th value of *resourceListCSI* |
| | | '101' | 6th PUCCH resource provided by *pucch-ResourceId* obtained from the 6th value of *resourceList* | 6th PUCCH resource provided by *pucch-ResourceId* obtained from the 6th value of *resourceListCSI* |
| | | '110' | 7th PUCCH resource provided by *pucch-ResourceId* obtained from the 7th value of *resourceList* | 7th PUCCH resource provided by *pucch-ResourceId* obtained from the 7th value of *resourceListCSI* |
| | | '111' | 8th PUCCH resource provided by *pucch-ResourceId* obtained from the 8th value of *resourceList* | 8th PUCCH resource provided by *pucch-ResourceId* obtained from the 8th value of *resourceListCSI* |

*FIG. 10*

| R | Serving Cell ID | | BWP ID | Oct. 1 |
|---|---|---|---|---|
| R | Report ID | Set ID | PUCCH Res. ID | Oct. 2 |

*FIG. 12*

| R | Serving Cell ID | | BWP ID | Oct. 1 |
|---|---|---|---|---|
| Set ID 3 | Set ID 2 | Set ID 1 | Set ID 0 | Oct. 2 |
| R | R | PUCCH Res. 1 | PUCCH Res. 0 | Oct. 3 |
| R | R | PUCCH Res. 3 | PUCCH Res. 2 | Oct. 4 |

*FIG. 13*

| R | Serving Cell ID | | BWP ID | Oct. 1 |
|---|---|---|---|---|
| PUCCH 3 | PUCCH 2 | PUCCH 1 | PUCCH 0 | Oct. 2 |

*FIG. 14*

| R | Serving Cell ID | | BWP ID | Oct. 1 |
|---|---|---|---|---|
| Set ID | PUCCH Res. ID | Nrep | | Oct. 2 |

*FIG. 15*

DYNAMIC PUCCH REPETITION VIA PERIODIC CSI

TECHNICAL FIELD

The present disclosure relates to the transmission of uplink control channel information in a wireless network, and more particularly relates to techniques for configuring a wireless device for such transmission.

BACKGROUND

The 3$^{rd}$-Generation Partnership Project (3GPP) is continuing development of the next generation mobile wireless communication system (5G), commonly referred to as new radio (NR), which will support a diverse set of use cases and a diverse set of deployment scenarios. The latter includes deployment at both low frequencies (below 6 GHZ) and very high frequencies (up to 10's of GHZ).

NR uses CP-OFDM (Cyclic Prefix Orthogonal Frequency Division Multiplexing) in both downlink (DL) (i.e., from a network node, gNB, or base station, to a user equipment or UE) and uplink (UL) (i.e., from UE to gNB). DFT-spread OFDM (Discrete Fourier Transform-spread Orthogonal Frequency Division Multiplexing) is also supported in the uplink. In the time domain, NR downlink and uplink transmissions are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically on a slot basis. An example of an NR slot is shown in FIG. 1, which illustrates the time-domain structure of an NR signal having 14-symbol slots, which might be used with a subcarrier spacing of 15 kHz. The first two symbols contain physical downlink control channel (PDCCH) while the rest contains physical shared data channel, either PDSCH (physical downlink shared channel) or PUSCH (physical uplink shared channel).

Different subcarrier spacing values are supported in NR. The supported subcarrier spacing values (also referred to as different numerologies) are given by $\Delta f=(15 \times 2^{\mu})$ kHz where $\mu \in \{0,1,2,3,4\}$. $\Delta f=15$ kHz is the basic subcarrier spacing. The slot durations for different subcarrier spacings are given by $$\frac{1}{2^{\mu}} \text{ ms.}$$

In the frequency domain, a system bandwidth is divided into resource blocks (RBs), each corresponding to 12 contiguous subcarriers. The RBs are numbered starting with 0 from one end of the system bandwidth. The basic NR physical time-frequency resource grid is illustrated in FIG. 2., where only one resource block (RB) within a 14-symbol slot is shown. One OFDM subcarrier during one OFDM symbol interval forms one resource element (RE).

Downlink (DL) and uplink (UL) data transmissions can be either dynamically or semi-statically or semi-persistently scheduled by a gNB. In case of dynamic scheduling, the gNB may transmit in a downlink slot downlink control information (DCI) to a UE on PDCCH (Physical Downlink Control Channel) about data carried on a downlink physical shared channel (PDSCH) to the UE and/or data on an uplink physical shared channel (PUSCH) to be transmitted by the UE. In case of semi-statically scheduling, periodic data transmission in certain slots can be configured by RRC directly. In case of semi-persistent scheduling, periodic data transmission in certain slots can be configured by RRC and activated/deactivated by DCI.

For each transport block data transmitted over PDSCH, a HARQ ACK is sent in an UL physical uplink control channel (PUCCH), indicating whether the UE decoded the transport block successfully. An ACK is sent if it is decoded successfully and a NACK is sent otherwise.

PUCCH can also carry other UL control information (UCI) such as scheduling request (SR), link recovery request (LRR) and DL channel state information (CSI).

There are three DCI formats defined for scheduling PDSCH in NR, i.e., DCI format 1_0 and DCI format 1_1, which were introduced in NR Rel-15, and DCI format 1_2 which was introduced in NR Rel-16. DCI format 1_0 has a smaller size than DCI 1_1 and can be used when a UE is not fully connected to the network, while DCI format 1_1 can be used for scheduling MIMO (Multiple-Input-Multiple-Output) transmissions with multiple MIMO layers.

In NR Rel-16, DCI format 1_2 was introduced for downlink scheduling. One of the main motivations for having the new DCI format is to be able to configure a very small DCI size which can provide some reliability improvement without losing much flexibility. The main design target of the new DCI format is thus to have DCI with configurable sizes for some fields with a minimum DCI size targeting a reduction of 10-16 bits relative to Rel-15 DCI format 1_1.

NR HARQ ACK/NACK Feedback Over PUCCH

When receiving a PDSCH in the downlink from a serving gNB at slot n, a UE feeds back a HARQ ACK (alternatively called 'HARQ ACK/NACK' or 'ACK/NACK') at slot n+k over a PUCCH (Physical Uplink Control Channel) resource in the uplink to the gNB if the PDSCH is decoded successfully. Otherwise, the UE sends HARQ-ACK at slot n+k to the gNB to indicate that the PDSCH is not decoded successfully. If two transport blocks (TBs) are carried by the PDSCH, then an ACK/NACK is reported for each TB.

For DCI format 1_0, k is indicated by a 3-bit PDSCH-to-HARQ_feedback timing indicator field. For DCI formats 1_1 and 1_2, k is indicated either by a 0-3 bit PDSCH-to-HARQ_feedback timing indicator field, if present, or by higher layer configuration through Radio Resource Control (RRC) signaling. Separate RRC configuration of PDSCH to HARQ-Ack timing are used for DCI formats 1_1 and 1_2.

For DCI format 1_1, if code block group (CBG) transmission is configured, a HARQ-ACK for each CBG in a TB is reported instead.

In case of carrier aggregation (CA) with multiple carriers and/or TDD operation, multiple aggregated HARQ-ACK bits need to be sent in a single PUCCH.

In NR, up to four PUCCH resource sets can be configured to a UE. A PUCCH resource set with pucch-Resource-SetId=0 can have up to 32 PUCCH resources, while for PUCCH resource sets with pucch-ResourceSetId=1 to 3 each set can have up to 8 PUCCH resources. A UE determines the PUCCH resource set in a slot based on the number of aggregated UCI (Uplink Control Information) bits to be sent in the slot. The UCI bits consists of HARQ-ACK, scheduling request (SR), link recovery request (LRR) and channel state information (CSI) bits.

A 3-bit PUCCH resource indicator (PRI) field in DCI maps to a PUCCH resource in a set of PUCCH resources with a maximum of eight PUCCH resources. For the first set of PUCCH resources with pucch-ResourceSetId=0 and when the number of PUCCH resources, $R_{PUCCH}$, in the set is larger than eight, the UE determines a PUCCH resource with index $r_{PUCCH}$, $0 \leq r_{PUCCH} \leq R_{PUCCH}-1$, for carrying HARQ-ACK information in response to detecting a last DCI format 1_0 or DCI format 1_1 in a PDCCH reception, among DCI formats 1_0 or DCI formats 1_1 the UE received with a value of the PDSCH-to-HARQ_feedback timing indicator field indicating a same slot for the PUCCH transmission, as:

$$r_{PUCCH} =$$

$$\begin{cases} \left\lfloor \dfrac{n_{CCE,p} \cdot \left\lceil R_{PUCCH}/8 \right\rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \left\lceil R_{PUCCH}/8 \right\rceil}{N_{CCE,p}} \right\rfloor + \Delta_{PRI} \cdot \left\lceil \dfrac{R_{PUCCH}}{8} \right\rceil + R_{PUCCH} \bmod 8 & \text{if } \Delta_{PRI} \geq R_{PUCCH} \bmod 8 \end{cases}$$

where $N_{CCE,p}$ is a number of control channel elements (CCEs) in CORESET p of the PDCCH reception for the DCI format 1_0 or DCI format 1_1, as described in Subclause 10.1 of 3gpp TS38.213 v16.4.0, $n_{CCE,p}$ is the index of a first CCE for the PDCCH reception, and APRI is a value of the PUCCH resource indicator field in the DCI format 1_0 or DCI format 1_1.

PUCCH Formats

Five PUCCH formats are defined in NR, i.e., PUCCH formats 0 to 4. The UE transmits UCI in a PUCCH using PUCCH format 0 if the transmission is over 1 symbol or 2 symbols,
  the number of HARQ-ACK information bits with positive
    or negative SR (HARQ-ACK/SR bits) is 1 or 2.
  The UE transmits UCI in a PUCCH using PUCCH format 1 if
  the transmission is over 4 or more symbols,
  the number of HARQ-ACK/SR bits is 1 or 2.
  The UE transmits UCI in a PUCCH using PUCCH format 2 if
  the transmission is over 1 symbol or 2 symbols,
  the number of UCI bits is more than 2.
  The UE transmits UCI in a PUCCH using PUCCH format 3 if
  the transmission is over 4 or more symbols,
  the number of UCI bits is more than 2.
  The UE transmits UCI in a PUCCH using PUCCH format 4 if
  the transmission is over 4 or more symbols,
  the number of UCI bits is more than 2.
  PUCCH formats 0 and 2 use one or two OFDM symbols while PUCCH formats 1,3 and 4 can span from 4 to 14 symbols. Thus, PUCCH format 0 and 2 are referred to as short PUCCH while PUCCH formats 1,3 and 4 as long PUCCH.

Short PUCCH Formats

A PUCCH format 0 resource can be one or two OFDM symbols within a slot in time domain and one RB in frequency domain. UCI is used to select a cyclic shift of a computer-generated length 12 base sequence which is mapped to the RB. The starting symbol and the starting RB are configured by RRC. In case of 2 symbols are configured, the UCI bits are repeated in 2 consecutive symbols.

A PUCCH format 2 resource can be one or two OFDM symbols within a slot in time domain and one or more RBs in frequency domain. UCI in PUCCH Format 2 is encoded with RM (Reed-Muller) codes (≤11 bit UCI+CRC) or Polar codes (>11 bit UCI+CRC) and scrambled. In case two symbols are configured, UCI is encoded and mapped across two consecutive symbols.

Intra-slot frequency hopping (FH) may be enabled in the case where two symbols are configured for PUCCH formats 0 and 2. If FH is enabled, the starting PRB in the second symbol is configured by RRC. Cyclic shift hopping is used when two symbols are configured such that different cyclic shifts are used in the two symbols for PUCCH format 0.

Examples of one- and two-symbol short PUCCH, without FH, are shown in FIG. 3.

Long PUCCH Formats

A PUCCH format 1 resource is 4-14 symbols long and 1 PRB wide per hop. A computer-generated length-12 base sequence is modulated with UCI and weighted with time-domain orthogonal cover code (OCC). Frequency-hopping with one hop within the active UL BWP for the UE is supported and can be enabled/disabled by RRC. Base sequence hopping across hops is enabled in case of FH and across slots in case of no FH.

A PUCCH Format 3 resource is 4-14 symbols long and one or multiple PRB wide per hop. UCI in PUCCH Format 3 is encoded with RM (Reed-Muller) codes ($11 bit UCI+CRC) or Polar codes (>11 bit UCI+CRC) and scrambled.

A PUCCH Format 4 resource is also 4-14 symbols long but 1 PRB wide per hop. It has a similar structure as PUCCH format 3 but can be used for multi-UE multiplexing.

FIG. 4 illustrates example 14-symbol and 7-symbol long PUCCH, with intra-slot FH enabled. FIG. 5 also illustrates 14-symbol and 7-symbol long PUCCH, but with intra-slot FH disabled.

PUCCH Repetition

In Rel-15/16, PUCCH formats 1, 3, or 4 can be configured for repetition. A UE can be configured with a number of slots.

$$N_{PUCCH}^{repeat},$$

for repetitions of a PUCCH transmission by the RRC field nrofSlots in PUCCH-FormatConfig. For $$N_{PUCCH}^{repeat} > 1:$$

the UE repeats the PUCCH transmission with the UCI over $$N_{PUCCH}^{repeat}$$

slots
    a PUCCH transmission in each of the $$N_{PUCCH}^{repeat}$$

slots has a same number of consecutive symbols,
    a PUCCH transmission in each of the $$N_{PUCCH}^{repeat}$$

slots has a same first symbol,
    if the UE is configured to perform frequency hopping for
        PUCCH transmissions across different slots
        the UE performs frequency hopping per slot
        the UE transmits the PUCCH starting from a first PRB
            in slots with even number and starting from the
            second PRB in slots with odd number. The slot
            indicated to the UE for the first PUCCH transmission
            has number 0 and each subsequent slot until the UE
            transmits the PUCCH in $$N_{PUCCH}^{repeat}$$

slots is counted regardless of whether or not the UE transmits the PUCCH in the slot
        the UE does not expect to be configured to perform
            frequency hopping for a PUCCH transmission
            within a slot
        If the UE is not configured to perform frequency hopping
            for PUCCH transmissions across different slots and if
            the UE is configured to perform frequency hopping for
            PUCCH transmissions within a slot, the frequency
            hopping pattern between the first PRB and the second
            PRB is the same within each slot.
    FIG. 6 illustrates an example of PUCCH repetition in two slots with (a) inter-slot FH enabled and (b) inter-slot FH disabled while intra-slot FH is enabled.

If a PUCCH is repeated and it is to be transmitted in the same symbols as a PUSCH, the PUCCH resource is transmitted and the PUSCH is not (that is, the PUSCH is 'dropped').

When repeating PUCCH, and if different UCI types such as HARQ-ACK and CSI would be transmitted in the same slots, the UE will only transmit one of the UCI types according to the priority of the UCI type. According to 3GPP TS 38.213 rev. 16.4.0, section 9.2.6:

--------------------begin 3GPP specification excerpt--------------------
A UE does not multiplex different UCI types in a PUCCH transmission with repetitions over $N_{PUCCH}^{repeat} > 1$ slots. If a *UE* would transmit a first PUCCH over more than one slot and at least a second PUCCH over one or more slots, and the transmissions of the first PUCCH and the second PUCCH would overlap in a number of slots then, for each slot of the number of slots and with UCI type priority of HARQ-ACK > SR > CSI with higher priority > CSI with lower priority
    the UE does not expect the first PUCCH and any of the second
    PUCCHs to start at a same slot and include a UCI type with
    same priority -continued if the first PUCCH and any of the second PUCCHs include a UCI
type with same priority, the UE transmits the PUCCH starting
at an earlier slot and does not transmit the PUCCH starting
at a later slot
if the first PUCCH and any of the second PUCCHs do not
include a UCI type with same priority, the UE transmits the
PUCCH that includes the UCI type with higher priority and
does not transmit the PUCCH that include the UCI type with
lower priority
--------------------end 3GPP specification excerpt--------------------

Sub-Slot Based PUCCH Transmission

In NR Rel-16, sub-slot based PUCCH transmission was introduced so that HARQ-Ack associated with different type of traffic can be multiplexed in a same UL slot, each transmitted in a different sub-slot. The sub-slot size can be higher layer configured to either 2 symbols or 7 symbols. In case of sub-slot configuration each with 2 symbols, there are 7 sub-slots in a slot. In case of sub-slot with 7 symbols, there are two sub-slots in a slot.

HARQ A/N Enhancement for URLLC in NR Rel-16

In NR Rel 16, a higher priority may be assigned to PDSCHs carrying URLLC (Ultra-reliable Low latency) traffic and indicated in DCIs scheduling the PDSCHs. HARQ ACK/NACK information for PDSCHs with higher priority is transmitted separately from HARQ A/N information for other PDSCHs. This allows HARQ A/N for URLLC traffic be transmitted early, in different PUCCH resources, and more reliably.

Furthermore, in NR Rel-16, it has been agreed that at least one sub-slot configuration for PUCCH can be UE-specifically configured and that multiple HARQ-ACK transmissions per slot are possible. The sub-slot configuration supports periodicities of two symbols (i.e., seven two-symbol PUCCH occasions per slot) and 7 symbols (i.e., two 7-symbol PUCCH occasions per slot). One of the reasons for introducing these sub-slot configurations in NR Rel-16 is to enable the possibility for multiple opportunities of HARQ-ACK transmissions within a slot without needing to configure several PUCCH resources. For example, in Rel-16, a UE running URLLC service may be configured with a possibility of receiving PDCCH in every second OFDM symbol e.g., symbol 0, 2, 4, . . . , 12 and be configured with a PUCCH resource with sub-slot configuration seven 2-symbol sub-slots within a slot for HARQ-ACK transmission also in every second symbol, e.g., 1, 3, . . . , 13. For a Rel-16 UE configured with sub-slots for PUCCH transmission, the PDSCH-to-HARQ feedback timing indicator field in DCI indicates the timing offset in terms of sub-slots instead of slots.

CSI Framework in NR

In NR, a UE can be configured with multiple CSI reporting settings (each represented by a higher layer parameter CSI-ReportConfig with an associated identity ReportConfigID) and multiple CSI resource settings (each represented by a higher layer parameter CSI-ResourceConfig with an associated identity CSI-ResourceConfigId). Each CSI resource setting can contain multiple CSI resource sets (each represented by a higher layer parameter NZP-CSI-RS-ResourceSet with an associated identity NZP-CSI-RS-ResourceSetId for channel measurement or by a higher layer parameter CSI-IM-ResourceSet with an associated identity CSI-IM-ResourceSetId for interference measurement), and each NZP CSI-RS resource set for channel measurement can contain up to 8 NZP CSI-RS resources. For each CSI reporting setting, a UE feeds back a set of CSIs, which may include one or more of a CRI (CSI-RS resource indicator), a RI, a PMI, and a CQI per CW, depending on the configured report quantity.

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band.

Each CSI reporting setting contains at least some of the following information:

A CSI resource setting for channel measurement based on NZP CSI-RS resources (represented by a higher layer parameter resourcesForChannelMeasurement).

A CSI resource setting for interference measurement based on CSI-IM resources (represented by a higher layer parameter CSI-IM-ResourcesForInterference).

Optionally, a CSI resource setting for interference measurement based on NZP CSI-RS resources (represented by a higher layer parameter nzp-CSI-RS-ResourcesForInterference)

Time-domain behavior, i.e., periodic, semi-persistent, or aperiodic reporting (represented by a higher layer parameter reportConfigType)

Frequency granularity, i.e., wideband or subband

CSI parameters to be reported such as RI, PMI, CQI, L1-RSRP/L1_SINR and CRI in case of multiple NZP CSI-RS resources in a resource set is used for channel measurement (represented by a higher layer parameter reportQuantity, such as 'cri-RI-PMI-CQI' 'cri-RSRP', or 'ssb-Index-RSRP')

Codebook types, i.e., type I or II if reported, and codebook subset restriction

Measurement restriction

For periodic and semi-static CSI reporting, only one NZP CSI-RS resource set can be configured for channel measurement and one CSI-IM resource set for interference measurement. For aperiodic CSI reporting, a CSI resource setting for channel measurement can contain more than one NZP CSI-RS resource set for channel measurement. If the CSI resource setting for channel measurement contains multiple NZP CSI-RS resource sets for aperiodic CSI report, only one NZP CSI-RS resource set can be selected and indicated to a UE. For aperiodic CSI reporting, a list of trigger states is configured (given by the higher layer parameters CSI-AperiodicTriggerStateList). Each trigger state in CSI-AperiodicTriggerStateList contains a list of associated CSI-ReportConfigs indicating the Resource Set IDs for channel and optionally for interference. For a UE configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one NZP CSI-RS resource set from the Resource Setting.

When more than one NZP CSI-RS resources are contained in the selected NZP CSI-RS resource set for channel measurement, a CSI-RS resource indicator (CRI) is reported by the UE to indicate to the gNB about the one selected NZP CSI-RS resource in the resource set, together with RI, PMI and CQI associated with the selected NZP CSI-RS resource. This type of CSI assumes that a PDSCH is transmitted from a single transmission point (TRP) and the CSI is also referred to as single TRP CSI.

Periodic CSI Reporting on PUCCH

In Rel-15/16, the timing of the CSI report is configured, and a given CSI report is associated with one PUCCH resource or one PUCCH resource per bandwidth part when multiple bandwidth parts are configured. This is specified according to the excerpt of 3GPP TS 38.331 rev 16.3.1 below showing a portion of the CSI-ReportConfig 1E. The IE identifies whether the report is a periodic, semi-persistent, or aperiodic report via the reportConfigType field. When reportConfigType is set to 'periodic', periodic reporting is used. The periodicity and slot offset of the periodic report are set by the 'reportSlotConfig' field, and the associated PUCCH resources are identified by the 'pucch-CSI-ResourceList' field. It can be observed that the periodicity of the report, not the PUCCH resource, is configured, since a PUCCH resource can contain any report that it is configured to carry.

```
------------------------ begin 3GPP specification excerpt ----------------------------
CSI-ReportConfig ::=                              SEQUENCE {
    reportConfigId                                    CSI-ReportConfigId,
    carrier                                           ServCellIndex
OPTIONAL,            -- Need S
    resourcesForChannelMeasurement                    CSI-ResourceConfigId,
    csi-IM-ResourcesForInterference                   CSI-ResourceConfigId
OPTIONAL,            -- Need R
    nzp-CSI-RS-ResourcesForInterference               CSI-ResourceConfigId
OPTIONAL,            -- Need R
    reportConfigType                                  CHOICE {
        periodic                                          SEQUENCE {
                        reportSlotConfig                      CSI-
ReportPeriodicityAndOffset,
                        pucch-CSI-ResourceList                SEQUENCE (SIZE
(1..maxNrofBWPs)) OF PUCCH-CSI-Resource
            },
        semiPersistentOnPUCCH                             SEQUENCE {
                        reportSlotConfig                      CSI-
ReportPeriodicityAndOffset,
                        pucch-CSI-ResourceList                SEQUENCE (SIZE
(1..maxNrofBWPs)) OF PUCCH-CSI-Resource
            },
        semiPersistentOnPUSCH                             SEQUENCE {
                        reportSlotConfig                      ENUMERATED {sl5,
sl10, sl20, sl40, sl80, sl160, sl320},
                        reportSlotOffsetList                  SEQUENCE (SIZE (1..
maxNrofUL-Allocations)) OF INTEGER(0..32),
                        p0alpha                               P0-PUSCH-
```

-continued

```
AlphaSetId
  },
    aperiodic                                      SEQUENCE {
              reportSlotOffsetList                 SEQUENCE (SIZE
(1..maxNrofUL-Allocations)) OF INTEGER(0..32)
    }
  }
----------------------- end 3GPP specification excerpt ----------------------------
```

Aperiodic CSI Feedback on PUCCH

In current NR specifications, aperiodic CSI feedback can only be carried via PUSCH. Furthermore, in current NR specifications, the aperiodic CSI feedback can only be trigged via uplink related DCI (i.e., DCI formats 0_1 and 0_2). However, this is not flexible in a scenario that is downlink heavy where the gNB would schedule the UE with PDSCH via downlink related DCI (i.e., DCI formats 1_1 and 1_2) more often than scheduling the UE with PUSCH via uplink related DCI. To improve network scheduling flexibility, it is beneficial to support carrying CSI on PUCCH in response to a downlink grant.

SUMMARY

NR does not support dynamic indication of PUCCH repetition in Rel-16, which has led to the work to specify it in Rel-17. Prior art proposals to support dynamic PUCCH repetition include those where a PUCCH resource configuration includes a repetition factor and where the resource is indicated via DL DCI with PUCCH resource indicator (PRI) and those where a repetition factor is separately indicated in DL DCI. Because the primary function of PRI is to convey PUCCH resources for HARQ-ACK in Rel-15, it is difficult to use PRI as a means to support CSI on PUCCH. How to support dynamic indication of a repetition factor for both aperiodic CSI on PUCCH and periodic CSI on PUCCH is an open problem.

Therefore, embodiments herein provide methods to support dynamic indication of a repetition factor for both aperiodic CSI on PUCCH and periodic CSI on PUCCH. Mechanisms for dynamic control of a repetition factor for CSI feedback on PUCCH are enabled through the use of a periodic reporting configuration. Dynamic control signaling (DCI or MAC CE) carries an indication of a PUCCH resource associated with a repetition factor or an indication of a PUCCH resource and a separate field containing a repetition factor. The repetition factor of periodically reported CSI can be dynamically updated, and the overhead can be further reduced through the use of a 'zero' repetition factor. Both downlink and uplink grants can be used to control the repetition factor. HARQ-ACK and CSI can be reported together when triggered by a downlink grant. Furthermore, a CSI report can be transmitted once (together with HARQ-ACK) when triggered by a downlink grant.

An example method according to the techniques described herein, as implemented in a wireless device, comprises the steps of receiving signaling identifying a plurality of time instants in which the wireless device may transmit distinct CSI reports, receiving signaling identifying a set of one or more resources to be used to transmit a physical channel carrying CSI reports, and receiving control signaling that identifies a resource in the set of resources, where the control signaling indicates a repetition factor for repetitively transmitting a CSI report, either by association with the resource identified by the control signaling or by a distinct indicator included in the control signaling. The example method further comprises transmitting the CSI report on the identified resource, according to the repetition factor and in a time instant of the plurality of time instants.

Corresponding and complementary methods as implemented in a network node are also described below. Variations of all of these methods, corresponding apparatuses and systems, and various benefits that may be achieved with these techniques are described below, in detail.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 illustrates an example 14-symbol and 7-symbol long PUCCH with intra-slot FH enabled;

FIG. 10 shows an example mapping of PRI with additional PUCCH resources for periodic reporting;

FIG. 12 shows a report ID-based MAC CE for PUCCH resource update;

FIG. 13 shows a multiple PUCCH resource ID-based MAC CE for PUCCH resource update;

FIG. 14 shows PUCCH resource selection-based MAC CE for PUCCH resource update;

FIG. 15 shows-a direct repetition factor indication-based MAC CE for PUCCH resource update;

DETAILED DESCRIPTION

Figure 1:
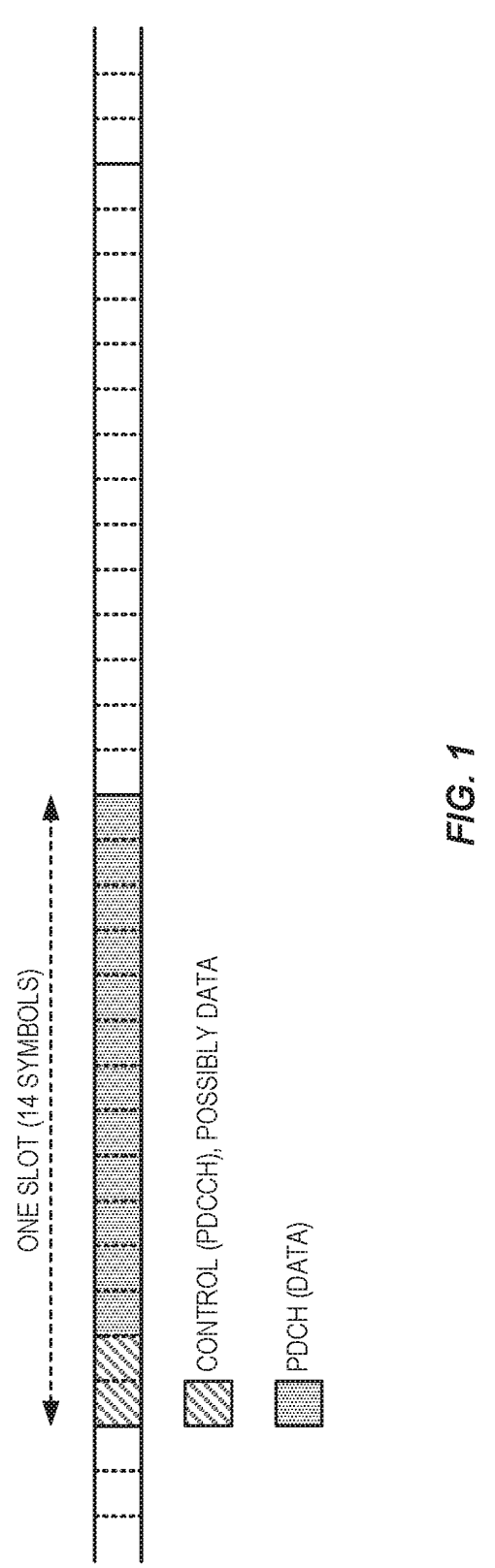
FIG. 1 illustrates data scheduling in NR in a slot basis.
Figure 2:
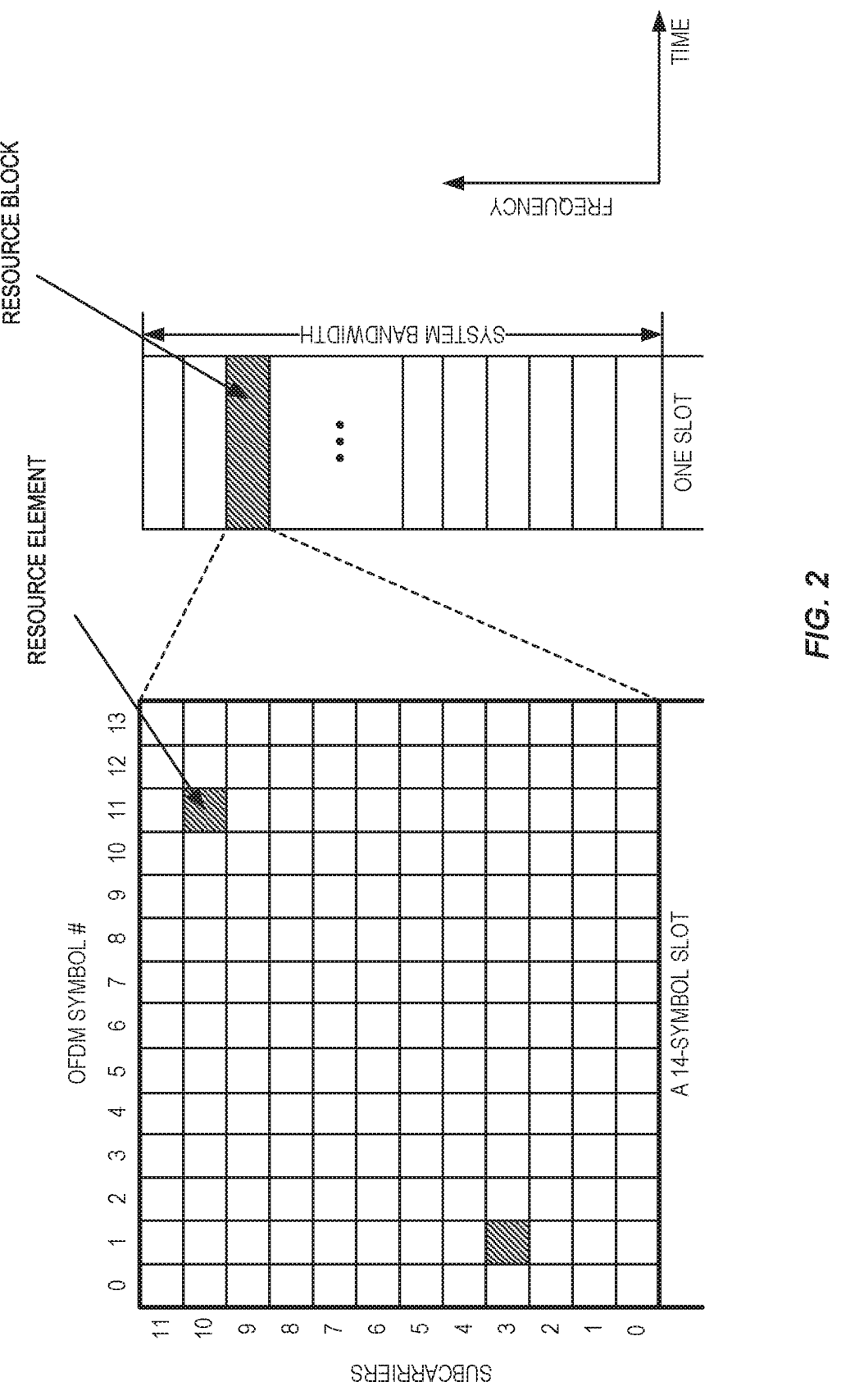
FIG. 2 illustrates the basic NR physical time-frequency resource grid.
Figure 3:
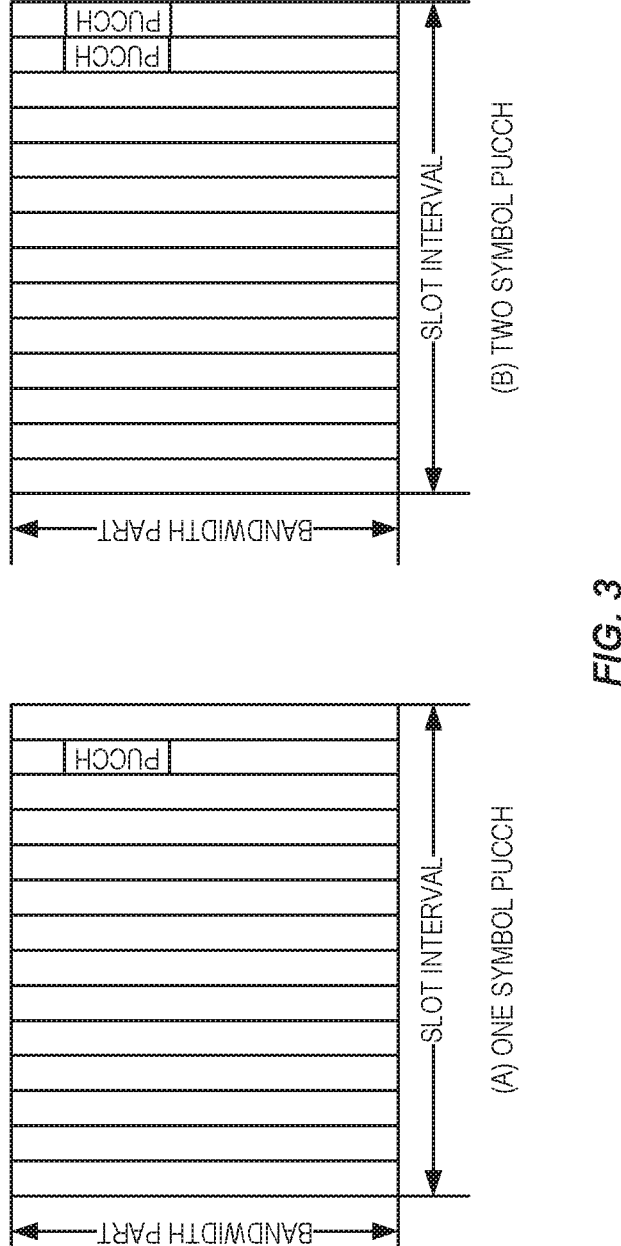
FIG. 3 illustrates an example of one and two symbol short PUCCH without FH.
Figure 5:
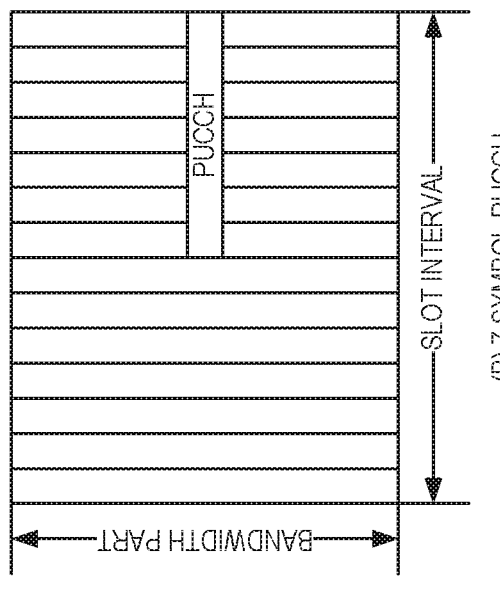
FIG. 5 illustrates an example 14-symbol and 7-symbol long PUCCH with intra-slot FH disabled.
Figure 6:
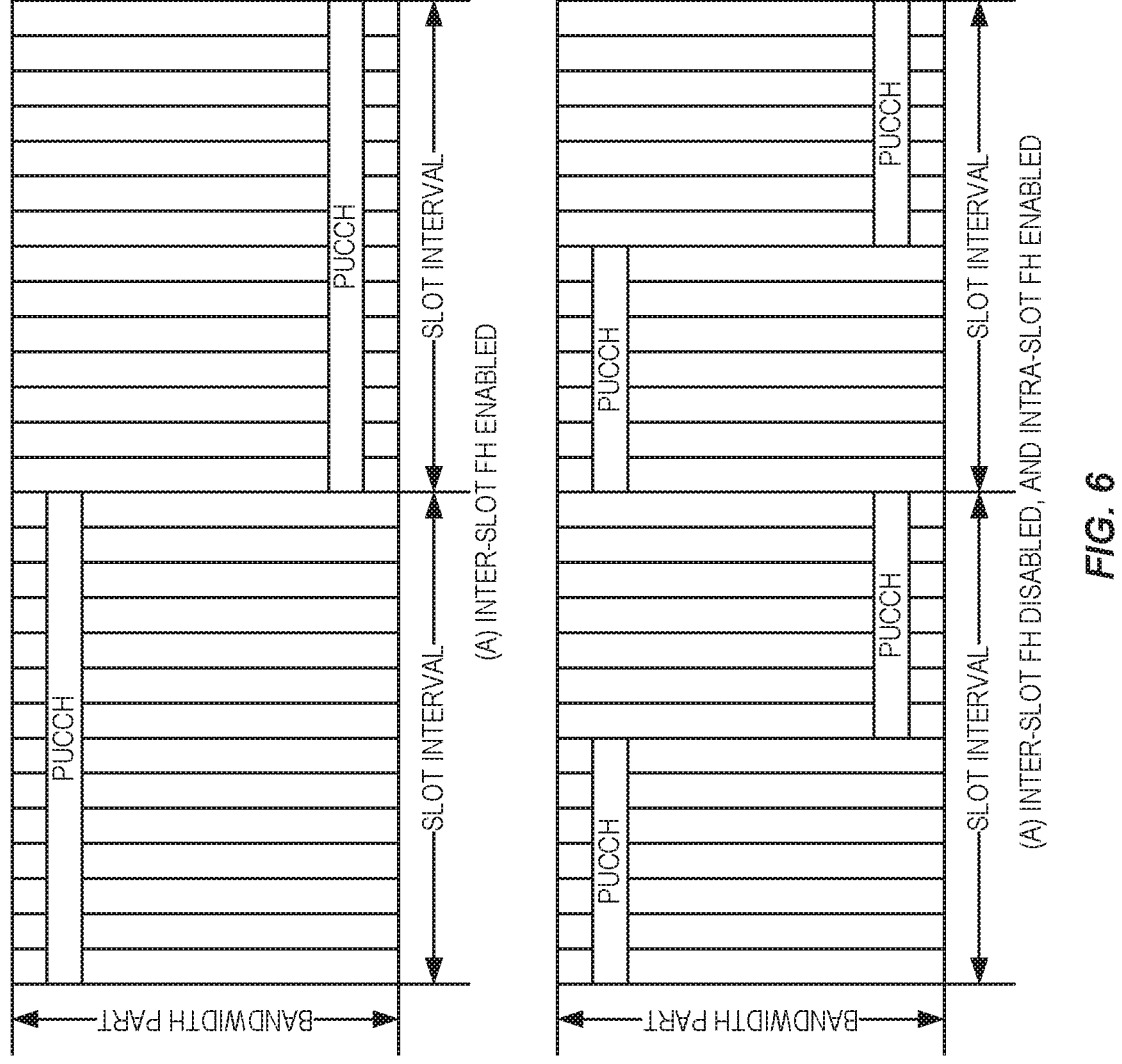
FIG. 6 illustrates an example of PUCCH repetition in two slots with (a) inter-slot FH enabled and (b) inter-slot FH disabled while intra-slot FH enabled.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include but are not limited to: a User Equipment device (UE) in a 3GPP network, a Machine Type Communication (MTC) device, and an Internet of Things (IOT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 7:
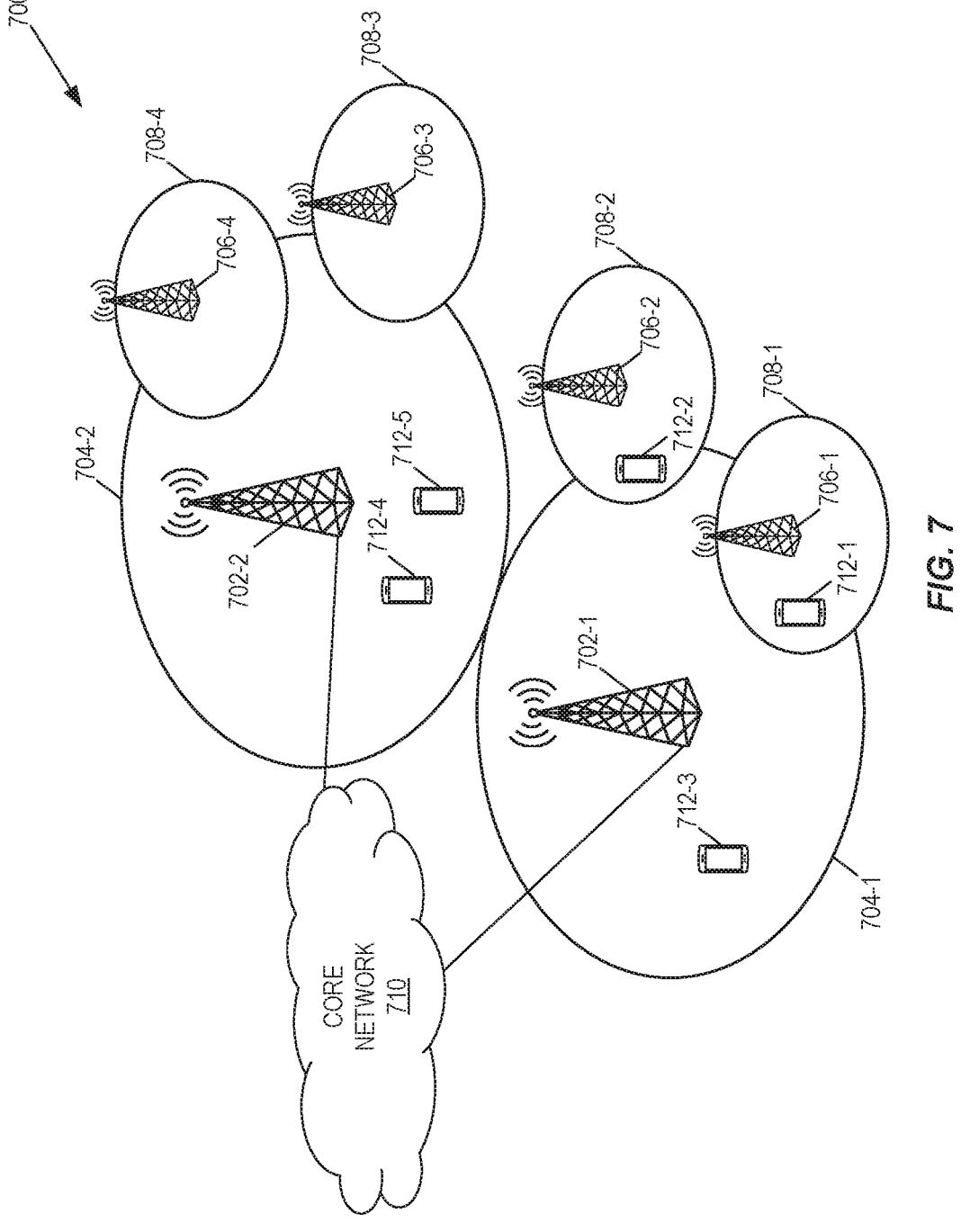
FIG. 7 illustrates one example of a cellular communications system according to some embodiments of the present disclosure.

FIG. 7 illustrates one example of a cellular communications system 700 in which embodiments of the present disclosure may be implemented. In the embodiments described herein, the cellular communications system 700 is a 5G system (5GS) including a Next Generation RAN (NG-RAN) and a 5G Core (5GC). In this example, the RAN includes base stations 702-1 and 702-2, which in the 5GS include NR base stations (gNBs) and optionally next generation eNBs (ng-eNBs) (e.g., LTE RAN nodes connected to the 5GC), controlling corresponding (macro) cells 704-1 and 704-2. The base stations 702-1 and 702-2 are generally referred to herein collectively as base stations 702 and individually as base station 702. Likewise, the (macro) cells 704-1 and 704-2 are generally referred to herein collectively as (macro) cells 704 and individually as (macro) cell 704. The RAN may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710, which in the 5G System (5GS) is referred to as the 5GC. The base stations 702 (and optionally the low power nodes 706) are connected to the core network 710.

The base stations 702 and the low power nodes 706 provide service to wireless communication devices 712-1 through 712-5 in the corresponding cells 704 and 708. The wireless communication devices 712-1 through 712-5 are generally referred to herein collectively as wireless communication devices 712 and individually as wireless communication device 712. In the following description, the wireless communication devices 712 are oftentimes UEs, but the present disclosure is not limited thereto.

As described above, CSI reporting on PUCCH is periodically transmitted in Rel-15/16 of NR. Since periodic transmission is by definition a long-term behavior, it has been sufficient so far to have higher layer control of CSI reporting, such as reconfiguration of parameters and activation/deactivation through MAC CEs. However, with dynamically indicated PUCCH repetition through DCI, a much faster update of PUCCH reporting must be used. Such a dynamic indication of PUCCH repetition factor must convey at least the repetition factor to be used and which PUCCH resource the repetition factor applies to. If the repetition factor itself is solely conveyed, the PUCCH resource must be known a priori, e.g., through higher layer signaling, which is highly restrictive compared to the dynamic PUCCH resource indication (PRI) used in Rel-15/16 NR.

The requirement to control periodic PUCCH reporting through DCI then requires new mechanisms in NR. PRI may be used to convey the resource used for repetition. However, since PRI is used to indicate resources to carry HARQ-ACK in Rel-15/16, and since HARQ-ACK resources are aperiodically allocated (e.g., applying only to a single PDSCH transmission), new solutions are needed to support CSI.

The repetition factor of periodically transmitted CSI must somehow be updated via DCI. Rel-15/16 PRI does not apply to periodic CSI reporting configurations, and so some mechanism to tie PRI to periodic CSI reporting is needed if PRI is to update the reports. One approach could be to use PRI to indicate a periodic CSI reporting configuration that additionally contains a repetition factor, and so when a periodic CSI configuration is identified by PRI, the repetition factor for the configuration is updated accordingly. Such an approach is feasible but has the drawbacks that it is inconsistent with the methodologies of Rel-15/16 where PUCCH resources are dynamically indicated rather than in CSI reporting configurations and that repetition is associated with the PUCCH resource rather than the reporting configurations. Dynamically indicating a CSI reporting configuration may also have the disadvantage that it may alter the content of the reports, rather than how the content is carried, increasing the complexity of CSI report calculation rather than adapting the channel used to carry the report.

An alternative approach is to extend the periodic CSI reporting configurations to contain multiple PUCCH resources. Then, when PRI indicates a PUCCH resource, the reporting configuration can be selected implicitly, and the PUCCH resource with its associated repetition factor will be used henceforth. If a PUCCH resource is used by multiple reporting configurations, then the multiple configurations will all be updated.

Figure 8:
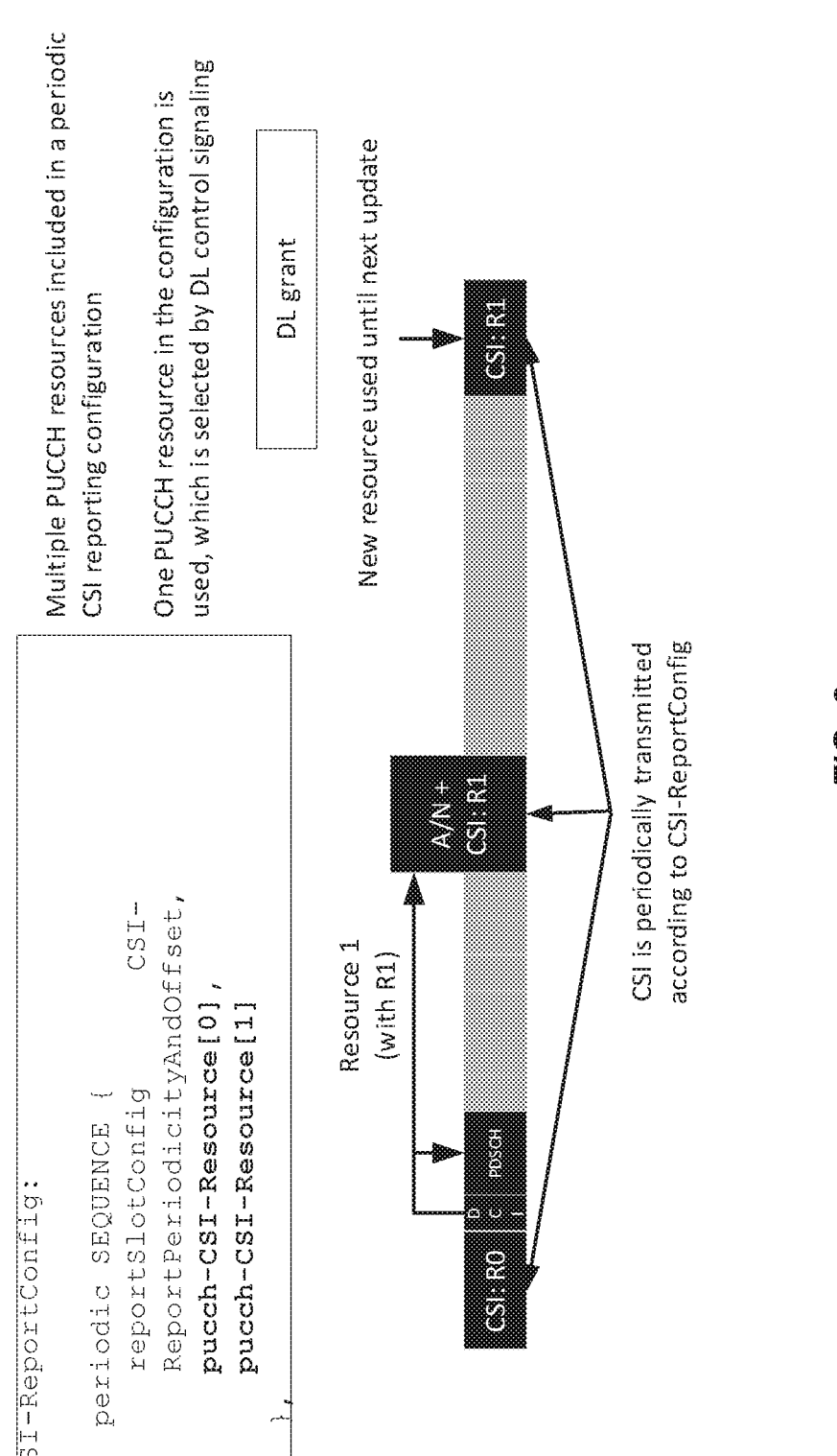
FIG. 8 illustrates an example of PUCCH repetition factor updating for periodic CSI via PUCCH resource.

Such an approach is illustrated in FIG. 8, which illustrates an example of PUCCH repetition factor update for periodic CSI via PUCCH resource. Here, a UE is configured with two PUCCH resources in (pucch-CSI-Resource[0] and pucch-CSI-Resource[1]) in a periodic CSI reporting configuration. A first number of repetitions R0 is configured within a PUCCH resource, 'Resource 0'. Resource 0 is also configured within pucch-CSI-Resource[0]. Similarly, a second PUCCH resource, 'Resource 1' with a second number of repetitions, R1, is configured within pucch-CSI-Resource[1]. The periodic reporting configuration provides a periodicity and offset identifying a series of time instants where a CSI report is to be transmitted. The UE initially uses pucch-CSI-Resource[0], therefore repeating the PUCCH R0 times for each CSI report. The UE receives a DL grant in DCI providing resources for a PDSCH that the UE is to receive. The DL grant also contains a PRI indicating a PUCCH resource, which here is Resource 1. In this example, the CSI report occurs in the same symbols where the HARQ-ACK is to be transmitted, and the CSI report and HARQ-ACK are multiplexed together on the PUCCH. The UE then attempts to decode the PDSCH and provides a HARQ-ACK response ('A/N') on Resource 1, repeating the PUCCH R1 times. Subsequent transmissions of the PUCCH carrying the CSI report will be repeated R1 times, until the repetition factor is further updated.

This approach can be implemented in part by changing the NR periodic CSI reporting configuration type in the NR CSI reporting configuration (i.e., updated reportConfigType of 'periodic' to 'periodic-r17' in the CSI-ReportConfig IE of 3GPP TS 38.331 rev 16.3.1) as follows:

--------------- begin proposed 3GPP specification excerpt --------------------------
```
periodic-r17                                                          SEQUENCE {
reportSlotConfig                              CSI-ReportPeriodicityAndOffset,
pucch-CSI-ResourceListBWP-r17SEQUENCE (SIZE (1..maxNrofBWPs)) OF
PUCCH-CSI-ResourceListExt-r17
},
pucch-CSI-ResourceListExt-r17 ::= SEQUENCE (SIZE
(1..maxNrofPUCCHResCSI)) OF PUCCH-CSI-Resource
```

-continued

```
}
maxNrofPUCCHResCSI          INTEGER ::= 8      -- Maximum number of
PUCCH resources that can be indicated by PRI and that carry CSI
-------------------- end proposed 3GPP specification excerpt ----------------------------
```

Since the Rel-16 CSI reporting configurations already support multiple PUCCH resources to be associated with different bandwidth part configurations, in the approach above, the PUCCH resource associated with each bandwidth part is replaced with a list of resources (pucch-CSI-ResourceListExt-r17) where the list contains the resources to be selected from for the given bandwidth part. When a PRI indication in DCI indicates the PUCCH resource for a BWP, the UE uses that PUCCH resource when transmitting the report.

The use of different PUCCH resources for a periodic CSI report can also be implemented in 3GPP TS 38.214 rev. 16.4.0, subclause 5.2.4, as shown in the following proposed excerpt, which includes additional text compared to the rev. 16.4.0 version. Here, the physical layer stores the last received PUCCH resource from DCI and uses it for subsequent transmission of a periodic CSI report. This use of a dynamically indicated value (in this case a PUCCH resource) for ongoing transmissions is similar to semi-persistent scheduling on PUCCH and to closed loop power control, since a DCI indicated value is used for transmission until a new one is received. However, PUCCH resource is not semi-persistently indicated in Rel-15/16, and so this represents an enhancement to Rel-15/16 operation. Furthermore, it can be observed that dynamically varying a PUCCH resource used in periodic transmission allows more than the repetition factor to vary, including any portion of the PUCCH resource, such as the starting PRB, the frequency hopping configuration, and the PUCCH format. Therefore, a benefit of embodiments that using a PUCCH resource to dynamically indicate a repetition value is that multiple parameters of the PUCCH resource configuration can be controlled in addition to the PUCCH repetition value.

be 1 bit, then the first two PUCCH resources in the list pucch-CSIResourceListExt-r17 are mapped to the two codepoints in the PRI field. In case the PRI field size of DCI format 1_2 is configured to be 2 bits, then the first four PUCCH resources in the list pucch-CSI-ResourceListExt-r17 are mapped to the two codepoints in the PRI field.

Figure 9:
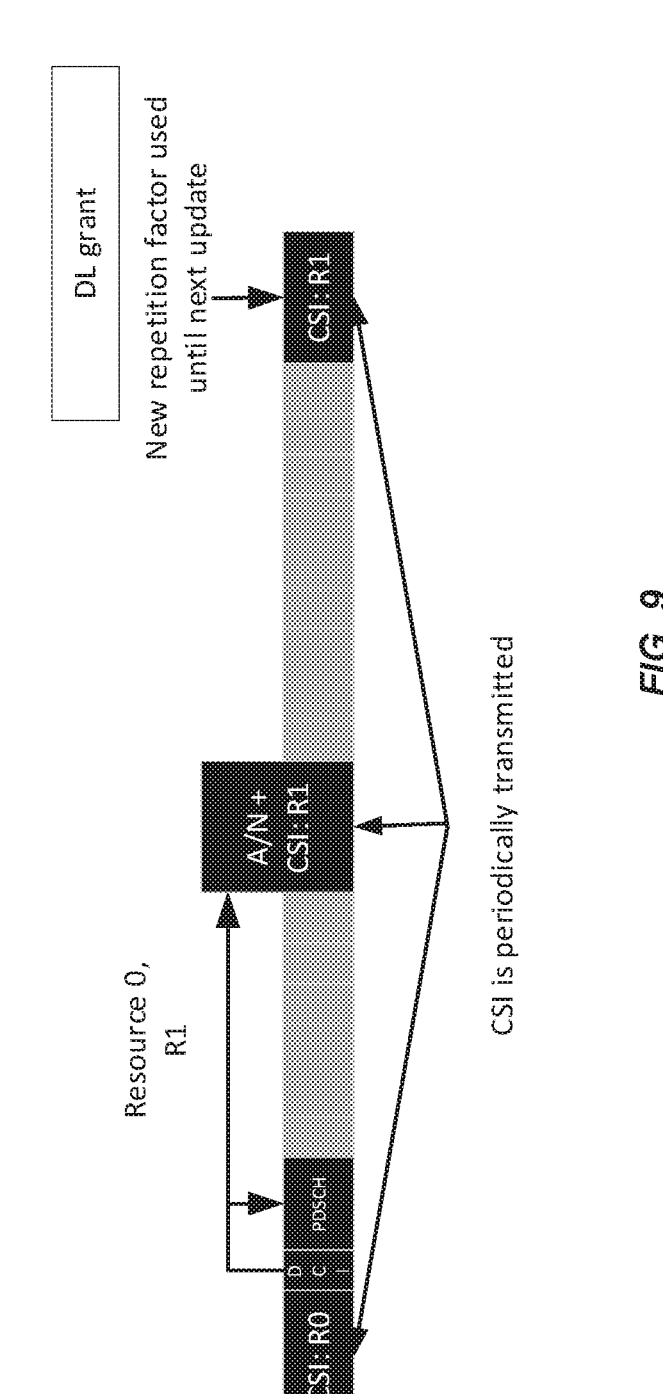
FIG. 9 illustrates an example of PUCCH repetition factor update for periodic CSI via direct indication.

A somewhat different approach to embedding the repetition factor within a PUCCH resource is to associate a repetition variable with a PUCCH resource. This is distinct from having an RRC field containing a repetition value for a PUCCH resource, since the repetition becomes a state variable stored in the physical layer that can be updated by DCI, whereas a field configured in RRC is fixed until reconfigured. Such an approach is illustrated in FIG. 9, which illustrates an example of PUCCH repetition factor update for periodic CSI via direct indication. Here, a UE is configured multiple PUCCH resources in one or more PUCCH resource sets. Each PUCCH resource has a variable associated with it that identifies the number of times the PUCCH resource is to be repeated. The UE is also configured to transmit CSI periodically on PUCCH using a Rel-15/16 CSI-ReportConfig, and the PUCCH resource used for the reporting is 'Resource 0'. The UE initially repeats Resource 0 R0 times. The UE receives a DL grant in DCI providing resources for a PDSCH that the UE is to receive. The DL grant also contains a PRI indicating a PUCCH resource, which here is the PUCCH resource 'Resource 0' and a repetition factor to be used for the indicated PUCCH resource, which here is a new PUCCH repetition factor R1. In this example, the CSI report occurs in the same symbols where the HARQ-ACK is to be transmitted, and the CSI report and HARQ-ACK are multiplexed together on the PUCCH. The UE then attempts to decode the PDSCH and

```
-------------------- begin proposed 3GPP specification excerpt --------------------------
5.2.4 CSI reporting using PUCCH
---------------Unchanged text omitted---------------
When the UE is configured with CSI Reporting on PUCCH formats 2, 3
or 4, each PUCCH resource is configured for each candidate UL BWP.
If multiple PUCCH resources are configured for each candidate UL
BWP, the PUCCH resource most recently indicated by DCI is used for
the corresponding CSI report.
If the UE is in an active semi-persistent CSI reporting
configuration on PUCCH and has not received a deactivation command,
the CSI reporting takes place when the BWP in which the reporting
is configured to take place is the active BWP, otherwise the CSI
reporting is suspended.
---------------Remainder of subclause unchanged---------------
-------------- end proposed 3GPP specification excerpt ----------------------------------
```

Note that in some embodiments using a DL grant to carry PRI, the DCI that indicates the PRI can be any one of DCI formats 1_0, 1_1, and 1_2. The PRI field size in DCI formats 1_0 and 1_1 are 3 bits. However, the PRI field size for DCI format 1_2 can be configurable to a value among 0, 1, 2, or 3 bits. In the above example in FIG. 8, the number of PUCCH resources in the list pucch-CSI-ResourceListExt-r17 is 8. Hence, when the PRI field size in DCI is 3 bits, each codepoint in the PRI field can be one-to-one mapped to one of the resources in the list pucch-CSI-ResourceListExt-r17. In case the PRI field size of DCI format 1_2 is configured to provides a HARQ-ACK response ('A/N'), repeating the PUCCH R1 times. Because Resource 0 was updated, subsequent transmissions of the PUCCH carrying the CSI report will be repeated R1 times, until the repetition factor is further updated.

In some embodiments where a repetition variable is associated with a PUCCH resource, DCI can separately indicate a PUCCH resource to be used for HARQ-ACK in slot n+k and a PUCCH resource that is to be updated with a new PUCCH repetition factor. In some such embodiments, the repetition factor may be jointly encoded with the PUCCH resource, or alternatively, separate fields may be used. Such embodiments incur higher DCI overhead, but have the benefit that the HARQ-ACK in slot n+k can use a different repetition factor than the separately indicated PUCCH resource. When the HARQ-ACK and a CSI report use different PUCCH resources, then different repetition factors can be used that best suit HARQ-ACK and CSI, respectively.

When the repetition factor is indicated as a field in DCI, an embodiment could be described by a revision to 3GPP TS 38.214 rev. 16.4.0 subclause 9.2.6 as shown in the proposed excerpt shown below, which contains additional text compared to the 16.4.0 version:

--------------------begin proposed 3GPP specification excerpt------------
9.2.6 PUCCH repetition procedure
For PUCCH formats 1, 3, or 4, a UE can be configured or indicated a number of slots, $N_{PUCCH}^{repeat}$, for repetitions of a *PUCCH* transmission by respective nrofSlots. If a UE is provided a PUCCH-config that includes
subslotLengthForPUCCH, the UE does not expect the PUCCH-config
to include nrofSlots. If the UE is configured with
dynPUCCHRepFactorList and receives numberOfPUCCHRep in a DCI
field, a PUCCH resource with PUCCH resource index j indicated in the $DCI$ uses a value of $N_{PUCCH}^{repeat}$ equal to the value of *numberOfPUCCHRep* for subsequent transmissions of the PUCCH resource with PUCCH
resource index j.

For $N_{PUCCH}^{repeat} > 1$,

--------------------Remainder of subclause unchanged--------------------
--------------------end proposed 3GPP specification excerpt--------------

In yet another alternative embodiment, the PRI field may select different PUCCH resources for HARQ-ACK feedback and periodic CSI feedback. Because their requirements typically differ, for example in terms of payload size and/or reliability, having HARQ-ACK feedback and periodic CSI feedback transmitted on different PUCCH resources can be beneficial as it allows resources to better match the requirements HARQ-ACK and CSI reception.

In such alternative embodiments where PRI selects different PUCCH resources for HARQ-ACK feedback and periodic CSI feedback, a second list of PUCCH resources is associated with the codepoints of the PRI field. The second list contains resources to be used for periodic CSI reporting, and is in addition to resourceList field that is used for the PUCCH resources in slot n+k that carry HARQ-ACK. The resources in the second list are identified by the PRI in the same way as the resources in resourceList. Each PRI codepoint identifies a PUCCH resource in the list with a one-to-one mapping. Therefore, a given PRI value selects two resources, one for use in slot n+k for HARQ-ACK, and another that is to be used in subsequent reports of a CSI report configuration. The CSI reporting configuration that is to be updated is according to the PUCCH resource that is selected. If a CSI reporting configuration contains the PUCCH resource, that PUCCH resource is used for subsequent reports for that configuration.

This alternative embodiment can be illustrated by FIG. 10, which shows an example mapping of PRI with additional PUCCH resources for period reporting. This figure shows a modified version of Table 9.2.3-2 from 3GPP TS 38.213 rev. 16.4.0, section 9.2.3, where underlined text indicates the modification. A new column is added to the right of the table containing the PUCCH resource to be used for periodic reporting, while the center column is the PUCCH resource used in Rel-15/16 for HARQ-ACK reporting in slot n+k. For example, when a PRI with value '010' is received in DCI, the UE selects the $3^{rd}$ PUCCH resource in resourceList to use for HARQ-ACK in slot n+k and the $3^{rd}$ PUCCH resource in resourceListCSI to use for subsequent reports of a periodic CSI reporting configuration. The UE identifies one or more periodic CSI reporting configurations to be updated by comparing the selected PUCCH resource to PUCCH resources in its CSI reporting configurations. If a periodic CSI reporting configuration contains the PUCCH resource, it uses that PUCCH resource in subsequent reports. The CSI reporting configurations contain one or more PUCCH resources, as was shown in FIG. 8.

Figure 11:
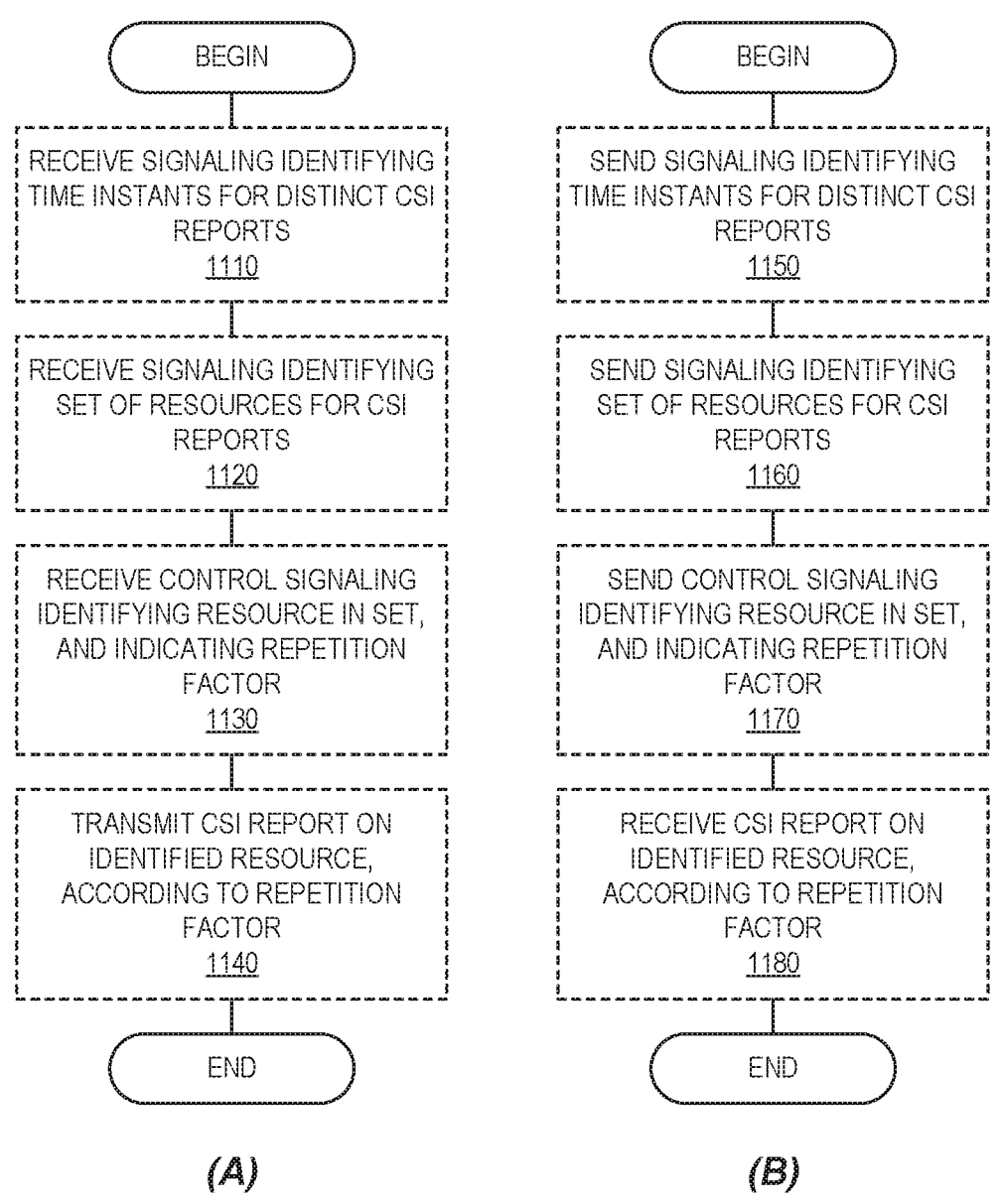
FIG. 11A illustrates a method performed by a wireless device for reporting channel state information, according to some embodiments of the present disclosure.
FIG. 11B illustrates a method performed by a network node for obtaining channel state information, according to some embodiments of the present disclosure.

In view of the detailed discussion and examples given above, it will be appreciated that FIG. 11A illustrates an example method as might be implemented in a wireless device or UE, for adapting a repetition factor of a physical channel carrying a CSI report. FIG. 11B illustrates a corresponding and complementary method carried out by a network node, such as a gNB serving the wireless device. The method illustrated in FIG. 11A should be understood as a generalization of several of the techniques discussed above, where a PRI or MAC CE is used to indicate a PUCCH resource, and where a repetition factor may be conveyed by DCI, either as a factor having a predetermined association with a configured resource indicated by the DCI, or as a factor having a separate value indicated by the DCI.

As shown at block 1110, the method comprises the step of receiving signaling identifying a plurality of time instants in which the wireless device may transmit distinct CSI reports, the signaling comprising at least a periodicity value. Note here that "distinct" CSI reports is meant to indicate separate instances of CSI reporting, each of which instances is reporting on a different time or circumstance. This is meant to distinguish from the repetition of a CSI report-a given CSI report may be repeated several times at each of the time instants referred to here, according to a repetition factor. So, the periodicity value here refers to a periodicity of providing distinct CSI reports, rather than to a periodicity of repetitions.

As shown at block 1120, the method further comprises receiving signaling identifying a set of one or more resources to be used to transmit the physical channel carrying CSI reports. Note that this may be considered a configuration step, which need not be performed dynamically. As shown at block 1130, the method further comprises receiving control signaling that identifies a resource in the set of resources. This control signaling may be the dynamic signaling discussed above, and may be either downlink control information (DCI) carried in a physical downlink control channel (PDCCH) or a medium access control control element (MAC CE) carried in a physical downlink shared channel (PDSCH). This control signaling indicates a repetition factor for repetitively transmitting a CSI report, either by association with the resource identified by the control signaling or by a distinct indicator included in the control signaling.

Finally, as shown at block 1140, the method comprises transmitting the CSI report on the identified resource, according to the repetition factor and in a time instant of the plurality of time instants.

In one variant of the method shown in FIG. 11A, a MAC CE identifies the PUCCH resource via a PUCCH resource set ID and an index within the set, or a CSI reporting configuration is configured with multiple PUCCH resources and the MAC CE selects among the PUCCH resources in the reporting configuration. Thus, in some embodiments or instances of the illustrated method, the control signaling is a MAC CE and either:

the resource is identified in the MAC CE with a field conveying an index identifying the set of resources among a plurality of sets of resources configured to the UE and a field conveying an index of the resource identifying the resource among the resources in the set of resources, or the UE determines one of a subset of the set of resources, where the subset is configured for use within a periodic reporting configuration, the resource configuration for at least one resource of the subset comprises a repetition factor, and the selected resource is the identified resource.

In another variant of the method shown in FIG. 11A, a dynamically updated repetition factor is used in periodic CSI reporting. The PRI (PUCCH Resource Indicator) indicates a resource configured for periodic reporting, where the resource configuration carries the repetition factor, or the PRI indicates a resource and there is a predetermined association with the repetition factor. Thus, in some embodiments or instances of the method shown in FIG. 11A, the control signaling is DCI, and the method further comprises one of:

determining one of a subset of the set of resources, where the subset is configured for use within a periodic reporting configuration, the resource configuration for at least one resource of the subset comprises a repetition factor, and the selected resource is the identified resource, and determining a repetition factor of a set of repetition factors associated with the resource as the repetition factor.

In some of these embodiments, the method may further comprise transmitting a plurality of distinct CSI reports using the resource and according to the repetition factor, in subsequent ones of the plurality of time instants.

In some embodiments or instances of the illustrated method, when the factor is '0' for periodic CSI reporting, the reporting is disabled. Thus, in some embodiments of the method, transmitting according to the repetition factor comprises not transmitting on the identified resource in each time instant when the repetition factor is a first value and transmitting on the identified resource in each time instant when the repetition factor is a value other than the first value.

In some embodiments or instances, when the periodic CSI report collides with HARQ-ACK, they are multiplexed together on PUCCH. Thus, in some embodiments or instances of the method shown in FIG. 11A, the method comprises the step of additionally transmitting HARQ-ACK on the identified resource according to the repetition factor when the HARQ-ACK is to be transmitted in the time instant.

In some embodiments or instances, the CSI is transmitted aperiodically together with HARQ-ACK, only when PRI indicates the resource, and in one of the periodic transmission opportunities in response to the DCI. In these embodiments, then, the method further comprises the steps of transmitting the CSI report once according to the repetition factor, wherein the transmission in response to the DCI is comprised in only the time instant of the plurality of time instants, and additionally transmitting HARQ-ACK in response to a downlink physical channel indicated by the DCI.

In some embodiments, the PRI is carried in an UL grant, and when the periodic CSI report collides with PUSCH, CSI is multiplexed on PUSCH if CSI is transmitted once; if the CSI is repeated, PUSCH is dropped. Thus, in some embodiments, the DCI indicates resources to be used for a PUSCH transmission in a different time instant of the plurality of time instants, and the method further comprises, when the repetition factor corresponds to transmitting the physical channel once, transmitting a physical uplink shared channel (PUSCH) in response to the DCI and that carries the CSI report when the PUSCH is to be transmitted in the different time instant, and when the repetition factor corresponds to transmitting the CSI more than once, transmitting the CSI report on the identified resource, according to the repetition factor, and in the different time instant.

FIG. 11B illustrates a method carried out by a network node, such as a gNB serving the wireless device, and is complementary to that shown in FIG. 11A. Again, the method illustrated in FIG. 11B should be understood as a generalization of several of the techniques discussed above, where a PRI or MAC CE is used to indicate a PUCCH resource, and where a repetition factor may be conveyed by DCI, either as a factor having a predetermined association with a configured resource indicated by the DCI, or as a factor having a separate value indicated by the DCI.

As shown at block 1150, the method of FIG. 11B comprises the step of sending, to a wireless device, signaling identifying a plurality of time instants in which the wireless device may transmit distinct CSI reports, the signaling comprising at least a periodicity value. Once again, "distinct" CSI reports is meant to indicate separate instances of CSI reporting, each of which instances is reporting on a different time or circumstance. This is meant to distinguish from the repetition of a CSI report-a given CSI report may be repeated several times at each of the time instants referred to here, according to a repetition factor. So, the periodicity value here refers to a periodicity of providing distinct CSI reports, rather than to a periodicity of repetitions.

As shown at block 1160, the method further comprises sending, to the wireless device, signaling identifying a set of one or more resources to be used to transmit the physical channel carrying CSI reports. Note that this may be considered a configuration step, which need not be performed dynamically. As shown at block 1170, the method further comprises sending, to the wireless device, control signaling that identifies a resource in the set of resources. This control signaling may be the dynamic signaling discussed above and may be either downlink control information (DCI) carried in a physical downlink control channel (PDCCH) or a medium access control control element (MAC CE) carried in a physical downlink shared channel (PDSCH). This control signaling indicates a repetition factor for repetitively transmitting a CSI report, either by association with the resource identified by the control signaling or by a distinct indicator included in the control signaling.

Finally, as shown at block 1180, the method comprises receiving the CSI report on the identified resource, according to the repetition factor and in a time instant of the plurality of time instants.

In one variant of the method shown in FIG. 11B, a MAC CE identifies the PUCCH resource via a PUCCH resource set ID and an index within the set, or a CSI reporting configuration is configured with multiple PUCCH resources and the MAC CE selects among the PUCCH resources in the reporting configuration. Thus, in some embodiments or instances of the illustrated method, the control signaling is a MAC CE and either:

the resource is identified in the MAC CE with a field
conveying an index identifying the set of resources
among a plurality of sets of resources configured to the
UE and a field conveying an index of the resource
identifying the resource among the resources in the set
of resources, or
the UE determines one of a subset of the set of resources,
where the subset is configured for use within a periodic
reporting configuration, the resource configuration for
at least one resource of the subset comprises a repeti-
tion factor, and the selected resource is the identified
resource.

In another variant of the method shown in FIG. 11B, a
dynamically updated repetition factor is used in periodic CSI
reporting. The PRI (PUCCH Resource Indicator) indicates a
resource configured for periodic reporting, where the
resource configuration carries the repetition factor, or the
PRI indicates a resource and there is a predetermined
association with the repetition factor. Thus, in some embodi-
ments or instances of the method shown in FIG. 11B, the
control signaling is DCI, and the method further comprises
one of:
determining one of a subset of the set of resources, where
the subset is configured for use within a periodic
reporting configuration, the resource configuration for
at least one resource of the subset comprises a repeti-
tion factor, and the selected resource is the identified
resource, and
determining a repetition factor of a set of repetition
factors associated with the resource as the repetition
factor.

In some of these embodiments, the method may further
comprise receiving a plurality of distinct CSI reports using
the resource and according to the repetition factor, in sub-
sequent ones of the plurality of time instants.

In some embodiments or instances of the illustrated
method, when the factor is '0' for periodic CSI reporting, the
reporting is disabled. Thus, in some embodiments of the
method, receiving according to the repetition factor com-
prises not transmitting on the identified resource in each
time instant when the repetition factor is a first value and
receiving on the identified resource in each time instant
when the repetition factor is a value other than the first value.

In some embodiments or instances, when the periodic CSI
report collides with HARQ-ACK, they are multiplexed
together on PUCCH. Thus, in some embodiments or
instances of the method shown in FIG. 11B, the method
comprises the step of additionally receiving HARQ-ACK on
the identified resource according to the repetition factor
when the HARQ-ACK is to be transmitted in the time
instant.

In some embodiments or instances, the CSI is received
aperiodically together with HARQ-ACK, only when PRI
indicates the resource, and in one of the periodic transmis-
sion opportunities in response to the DCI. In these embodi-
ments, then, the method further comprises the steps of
receiving the CSI report once according to the repetition
factor, wherein the transmission by the wireless device in
response to the DCI is comprised in only the time instant of
the plurality of time instants, and additionally receiving
HARQ-ACK in response to indicating a downlink physical
channel by the DCI.

In some embodiments, the PRI is carried in an UL grant,
and when the periodic CSI report collides with PUSCH, CSI
is multiplexed on PUSCH if CSI is transmitted once; if the
CSI is repeated, PUSCH is dropped. Thus, in some embodi-
ments, the DCI indicates resources to be used for a PUSCH transmission in a different time instant of the plurality of
time instants. In this case, when the repetition factor corre-
sponds to transmitting the physical channel once, the net-
work node will receive a physical uplink shared channel
(PUSCH) in response to the DCI, with the PUSCH carrying
the CSI report, when the PUSCH is to be transmitted in the
different time instant, and when the repetition factor corre-
sponds to transmitting the CSI more than once, receiving the
CSI report on the identified resource, according to the
repetition factor, and in the different time instant.

The techniques described herein may thus be understood
including methods, in a UE/wireless device, as well as in a
network node for adapting a repetition factor of a physical
channel carrying a CSI report, where the methods comprise
receiving and transmitting signaling identifying a plurality
of time instants in which the UE may transmit distinct CSI
reports, where the signaling comprises at least a periodicity
value. The UE/wireless device further receives signaling
identifying a set of one or more resources to be used to
transmit the physical channel. The UE also receives control
signaling that identifies a resource in the set of resources,
wherein the control signaling is one of downlink control
information (DCI) carried in a physical downlink control
channel (PDCCH) and a medium access control element
(MAC CE) carried in a physical downlink shared channel
(PDSCH). The repetition factor is either comprised within
the resource configuration or conveyed in addition to the
resource within the control signaling. The UE transmits the
CSI report on the identified resource according to the
repetition factor and in a time instant of the plurality of time
instants.

In some embodiments, the CSI report is periodically
transmitted, and adapting the repetition factor of a physical
channel carrying a CSI report may further comprise one of
determining one of a subset of the resources and determining
a repetition factor from a set. When one of the subset of
resources is determined, the subset is configured for use
within a periodic reporting configuration, the resource con-
figuration for at least one resource of the subset comprises
a repetition factor, and the determined resource is the
identified resource. When the repetition factor is determined
from a set, a repetition factor of a set of repetition factors
associated with the resource is determined as the repetition
factor. The UE transmits a plurality of CSI reports using the
resource according to the repetition factor in subsequent
transmissions of the plurality of time instants.

Dynamic Enablement of CSI Reporting

Other techniques may modify and/or be used with the
techniques described above.

For example, periodic transmission consumes overhead
and reduces UE battery life. One prior art solution is to use
semi-persistent CSI reporting, where a MAC control ele-
ment enables or disables CSI reporting on PUCCH. Because
higher layer signaling is used, the CSI reporting is controlled
more slowly than if it were signaling through DCI. Part of
the reason for this slower control is that it takes time for the
UE to compute a new CSI report when it is enabled. On the
other hand, if the CSI is being calculated periodically
anyway, simply transmitting a precalculated CSI report can
be done more quickly. Mechanisms herein adapt how a CSI
report is repeated when it is transmitted, rather than how it
is calculated. If a 'zero' repetition factor is used to turn off
the reporting, but not necessarily the CSI report calculation,
then DCI based enabling and disabling of CSI reporting may
be facilitated.

Therefore, in some embodiments adapting the repetition
factor of a physical channel carrying a CSI report may further comprise where transmitting according to the repetition factor comprises not transmitting on the identified resource in the time instant when the repetition factor is a first value and transmitting on the identified resource in the time instant when the repetition factor is a value other than the first value.

Operation with HARQ-ACK

UEs that transmit HARQ-ACK can do so according to the PUCCH resource indicated by PRI. In Rel-15/16 if a periodic CSI report is to be transmitted in the same slot as ('collides with') the HARQ-ACK, the CSI and HARQ-ACK can be multiplexed together on PUCCH. However, if a PUCCH resource is repeated, then only the UCI of same UCI type is to be repeated.

One of the reasons that only the repeated UCI is transmitted is that different UCI are generated by different mechanisms and with different timing. HARQ-ACK is generated in response to a received PDSCH whose presence may in turn be indicated by a DL grant in DCI, and the timing of PUCCH carrying HARQ-ACK can be indicated by DCI. On the other hand, periodic CSI reports are computed from CSI-RS and are transmitted in time according to a configured periodicity and offset. Since HARQ-ACK can essentially occur in any uplink slot, its timing will not be controlled relative to the fixed timing of periodic CSI. If either HARQ-ACK or CSI is repeated and they are multiplexed together, then one PUCCH occasion would have both types of UCI, while the others would have one. This complicates the reception, which may perform poorly since it is difficult to combine soft information from PUCCH occasions with different information content. Therefore, the simple solution in Rel-15/16 is to avoid multiplexing repeated UCI altogether.

An alternative approach would be to ensure that the periodic CSI and HARQ-ACK occupy only the same PUCCH occasions when they are to be multiplexed. This avoids the timing and performance drawbacks of unequally repeated UCI types, while allowing improved coverage.

Therefore, in some embodiments, adapting the repetition factor of a physical channel carrying a CSI report may further comprise additionally transmitting HARQ-ACK on the identified resource according to the repetition factor when the HARQ-ACK is to be transmitted in the time instant.

CSI transmission is generally used to provide information to improve downlink transmission. Therefore, when PDSCH is scheduled frequently, CSI reporting is particularly valuable. However, when PDSCH is not scheduled, especially for long periods of time, it can be less desirable to transmit CSI. Prior art techniques use an aperiodic CSI trigger or request to indicate when CSI should be transmitted. In these cases, the UE begins to calculate CSI at the time of the trigger, and completing the CSI computation in a short time before a CSI report is to be transmitted can require significant UE complexity or computational power. An alternative can be to always transmit CSI whenever the PDSCH is scheduled, but not when the PDSCH is not scheduled, and to transmit the CSI from periodic reports combined with HARQ-ACK. In this way, the UE can use precalculated CSI reports to reduce peak computational effort. Furthermore, the CSI is only transmitted when it is generally needed (when PDSCH is scheduled). The extra DCI overhead for an aperiodic CSI trigger or request is also avoided.

Therefore, in some embodiments adapting the repetition factor of a physical channel carrying a CSI report, the UE may further transmit the CSI report once according to the repetition factor, wherein the transmission in response to the DCI is comprised in only one of a plurality of time instants that correspond to the periodicity. The UE additionally transmits HARQ-ACK in response to a downlink physical channel indicated by the DCI.

Operation with PUSCH

Since in Rel-15, PRI is carried in downlink grants only, it is natural to first consider downlink grants to indicate the repetition factor. However, it is desirable to be able to update the repetition factor without unnecessary PDSCH or PUSCH transmissions and without excess DCI overhead. For example, if the control of repetition factor indication is only via downlink grants and there is no downlink data, a grant for a 'dummy' PDSCH with data not needed by the UE could be used to also indicate a new repetition factor. This naturally wastes downlink resource and incurs PDCCH overhead. However, if there is uplink data and the repetition factors could instead be supported in an uplink grant, then the PDSCH and PDCCH waste can be avoided. Therefore, in some embodiments, the repetition factor and resource indication are supported in an uplink as well as a downlink grant.

A PRI could be added to a DCI format such as DCI format 0_1. In this case the behavior is somewhat different than a PRI in a Rel-15/16 downlink grant, since the PRI does not provide resources for a HARQ-ACK transmission in response to the uplink grant. Instead, a PRI in an uplink grant is used to update a PUCCH for periodically transmitted CSI. While embodiments herein also consider where a second PRI indication is added to downlink grants, the added PRI indications in a downlink grant could be redundant, since the first PRI could be used to both provide resource for HARQ-ACK and to update the repetition factor of a PUCCH that periodically carries a CSI report. Therefore, if a new PRI field is to be added to DCI in Rel-17, it may be more efficient to add it to an uplink grant.

In Rel-15/16, if a PUCCH resource is repeated and is to be transmitted in at least one OFDM symbol that the PUSCH is to be transmitted in, the PUSCH transmission is dropped, and only the PUCCH is transmitted. However, since PUCCH repetition factors are only semi-statically controlled in Rel-15/16, it is not clear whether to treat a dynamic PUCCH repetition as repeated even when the repetition factor is dynamically indicated as not repeated (either a single transmission or none at all). For example, one possibility is to assume for the purposes of PUSCH dropping that repetition is used whenever the dynamic repetition indication is configured. This would save UE complexity but have the disadvantage of constraining PUSCH transmission to not collide with any of the PUCCH transmissions even if they were not repeated. Therefore, it seems better to drop the PUSCH according to the value of the indicated repetition factor, transmitting only the PUCCH when the PUCCH is repeated but transmitting only PUSCH (where the PUSCH carries at least the CSI) when there is only a single PUCCH transmission.

Therefore, in some embodiments adapting the repetition factor of a physical channel carrying a periodically transmitted CSI report, the DCI indicates resources to be used for a PUSCH transmission in a different time instant of the plurality of time instants. When the repetition factor corresponds to transmitting the physical channel once, the UE transmits a physical uplink shared channel (PUSCH) in response to the DCI, and the PUSCH carries the CSI report when the PUSCH is to be transmitted in the different time instant. When the repetition factor corresponds to transmitting the CSI more than once, the UE transmits the CSI report on the identified resource in the DCI, according to the repetition factor, and in the different time instant.

Updating Repetition Factor for Periodic CSI Reporting Based on MAC CE

In other embodiments, the repetition factor and/or associated PUCCH resource of a periodic CSI reporting configuration may be updated by a MAC CE. The values of the repetition factor may also include zero repetition, in which case the CSI is not reported until it is updated with a new non-zero repetition factor. This is different from the NR Rel-15 semi-persistent CSI on PUCCH where the repetition factor is configured for a PUCCH format rather than a PUCCH resource and PUCCH resources are RRC configured for a CSI reporting configuration.

In one such embodiment, the PUCCH resource is updated by a MAC CE. The PUCCH resource configuration includes a repetition value and is one of multiple PUCCH resources within a PUCCH resource set. If the same resource set sizes used for Rel-15/16, then there can be at most 8 PUCCH resources that can carry CSI, and so the PUCCH resource can be identified with 3 bits according to its position within the PUCCH resource set. The UE can be configured with up to 4 PUCCH resource sets, and so 2 additional bits are needed to identify the set. Note that the PUCCH resource ID in Rel-15/16 can be from 0 to 127, since UEs can support up to 128 PUCCH resources. If the PUCCH resource ID were used, then 7 bits would be needed to identify it. Therefore, since identifying the PUCCH resource according to its position in the PUCCH and which set it is in uses 3+2-5 bits, this can save 2 bits compared to simply using the PUCCH resource ID.

UEs can indicate support as few as one and at most four periodic CSI reports in Rel-15/16. Therefore, a MAC CE that updates a PUCCH resource needs to be able to handle at most 4 CSI reporting configurations. One approach would be to select one of the CSI reports and to indicate which PUCCH resource should be used. This would require 2 bits to select the CSI report and then 3 more to select the PUCCH resource. The serving cell and bandwidth for which the report applies will also need to be indicated. If we base the MAC CE design for the embodiment based on the Rel-15/16 MAC CE to activate semi-persistent CSI reporting, then 5 and 2 bits can be used for the serving cell and bandwidth part IDs, respectively. Then a first embodiment of the MAC CE reporting that uses a report ID to select the CSI report whose PUCCH resource is to be updated can be as illustrated in FIG. 12, which shows a report ID-based MAC CE for PUCCH resource update. A first octet contains the serving cell ID and bandwidth part ID and one reserved bit, 'R', while the second octet carries the PUCCH resource location within the set (PUCCH Res. ID), which set contains the resource (Set ID), the ID of the CSI report to be updated, and one reserved bit.

The above embodiment allows one report at a time to be updated by a MAC CE using two octets. If it is common to update multiple reports in a short period of time, it may be desirable to use a single MAC CE to update multiple reports to avoid the overhead from multiple MAC CEs. The example illustrated in FIG. 13 uses two extra octets and can update up to 4 reports with a single MAC CE. As in the embodiment above, a first octet contains the serving cell ID, bandwidth part ID, and a reserved bit. The second octet contains four set IDs, each of which corresponds to a CSI report. The set ID identifies the set in which a PUCCH resource to be used for the report is carried. The third and fourth octets together contain four PUCCH resource IDs that indicate where in each of the corresponding sets the PUCCH resource is located as well as four reserved bits. Then the PUCCH resource for the first CSI report is jointly identified by Set ID 0 and PUCCH Res. 0, the resource for the second CSI report is jointly identified by Set ID 1 and PUCCH Res. 1, and so on.

In the two embodiments for identifying PUCCH resources using MAC CEs above, only one single PUCCH resource per CSI report is required: the PUCCH resource is updated by the MAC CE. An alternative approach can be to configure a list of PUCCH resources for each CSI report configuration. Each CSI report can be configured with a list of up to N PUCCH resources, only one of which is used for reporting at a time. A MAC CE is used to select which of the N resources is to be used for reporting. If up to 4 CSI reports can be configured (again according to Rel-15/16 limitations), then it may be desirable for a single MAC CE to carry all 4 CSI reports. If the maximum number of PUCCH resources per CSI report, N, is constrained to be at most 4, then 2 bits can be used to identify the resource to be used from among those configured for the CSI report, and 4*2=8 bits can be used to select the PUCCH resource for each of 4 CSI reporting configurations. An embodiment using this approach is illustrated in FIG. 14. As in the embodiments above, a first octet contains the serving cell ID, bandwidth part ID, and a reserved bit. The second octet contains four identifiers, one for each of up to 4 CSI reports. The PUCCH resource for a first CSI report is selected among the up to 4 PUCCH resources configured for the report using the 'PUCCH 0' field. The PUCCH resource for a second CSI report is selected by 'PUCCH 1' and so on.

In some embodiments, it may be desirable to only update the repetition factor of a PUCCH resource rather than changing the PUCCH resource itself. Although this may result in less flexibility in PUCCH resource transmission, such an approach may be more similar to Rel-15/16 operation, and therefore more backward compatible. When a MAC CE based update is used to update only the repetition factor, similar design principles to those in the above embodiments may be used.

FIG. 15 illustrates an embodiment where a single PUCCH resource is updated with a MAC CE. As in the embodiment where one PUCCH resource is updated for a CSI report, here a PUCCH resource is selected from one of up to 8 resources within a PUCCH resource set using a 3 bit 'PUCCH Res. ID' field. The set where the resource is located is identified with a 2 bit 'Set ID' field. However, in this embodiment the repetition factor is directly indicated with a 3-bit 'Nrep' field. The 3-bit field length is chosen to match the number of repetitions that can be conveyed for PUCCH repetition type A or Type B through the 'numberOfRepetitions-r16' field in the PUSCH-Allocation-r16 IE. This field can indicate that 1, 2, 3, 4, 7, 8, 12, or 16 repetitions are to be used, and so if these same repetitions are encoded in the MAC CE for PUCCH repetition, 3 bits will be needed. The first octet contains the same information as in the other embodiments: a 5-bit serving cell ID, a 2-bit bandwidth part ID, and a reserved bit.

Therefore, in some embodiments in a UE for adapting a repetition factor of a physical channel carrying a CSI report, the control signaling is a MAC CE. The embodiment comprises either where the resource is identified in the MAC CE with a field conveying an index identifying the set of resources among a plurality of sets of resources configured to the UE and a field conveying an index of the resource identifying the resource among the resources in the set of resources, or it comprises where the UE determines one of a subset of the set of resources, where the subset is configured for use within a periodic reporting configuration, the resource configuration for at least one resource of the subset comprises a repetition factor, and the selected resource is the identified resource.

Other Design Features

In some embodiments, the PUCCH repetition is supported for both short PUCCH formats (format 0 and 2) and long PUCCH formats (format 1, 3, 4).

In some embodiments, per-repetition frequency-hopping of PUCCH is supported when the number of PUCCH repetitions is greater than 1. That is, one repetition of PUCCH is located at a first frequency location, and a different repetition of the same PUCCH is located at a second frequency location which is different from the first frequency location. One slot may include two or more repetitions, and two consecutive repetitions in a slot may start and/or end at a different frequency location.

In some embodiments, the PUCCH repetition can be signaled by DCI of the DL carrier, where the DL carrier is paired with the UL carrier of PUCCH for downlink-uplink data transmission. Alternatively, the PUCCH repetition can be signaled by cross-carrier scheduling DCI, where the DL carrier of DCI is different from the DL carrier paired with the UL carrier of PUCCH for data transmission.

In some embodiments, both semi-static and dynamic repetition can be configured, when the dynamic repetition is not configured for use in DCI or MAC-CE, the UE will follow the semi-static repetition configuration. In another alternative, an explicit indication in DCI or MAC-CE can be introduced to indicate whether a dynamic indication or a semi-static repetition indication should be followed by UE on periodic CSI transmission.

As an example, when the dynamic repetition factor indicated in DCI or MAC-CE is 0, it means a semi-statically configured repetition factor is used for periodic CSI transmission.

In some embodiments, a repetition factor indicated by UL DCI and the time domain resource allocation list for a PUSCH transmission can be assumed for repetition of periodic CSI.

As an example, the latest repetition factor used for PUSCH transmission can be assumed to be used for repletion of PUCCH carrying periodic CSI report.

In some embodiments, the repetition factor $K_{PUCCH}$ of PUCCH can be a function of repetition $k_{PUSCH}$ of PUSCH for periodic CSI report.

E.g., $K_{PUCCH}=K_{PUSCH}+\Delta_{PUCCH\_PUSCH}$, wherein the $\Delta_{PUCCH\_PUSCH}$ is an repetition factor offset between PUCCH and PUSCH which can be configured or a predetermined value.

The repetition factor offset may be related to the number of PRBs occupied by PUCCH and PUSCH, whether inter-/intra-slot frequency offset is enabled, the transmit power of PUSCH and PUCCH.

In some embodiments, when a dynamic DCI is used to update the PUCCH repetition factor for periodic CSI reporting, the DCI can be:

an existing DCI format with a new RNTI
a new DCI format with a new RNTI.
   E.g., the repetition factor of PUCCH can be indicated by the 2 bit repetition indication field in a new DCI format 2-7 with CRC scrambled by REP-PUCCH-RNTI, a repetition indication to repetition factor mapping can be based on the below table

TABLE 1

Mapping of repetition indication to repetition factor $K_{PUCCH}$ values for PUCCH

| repetition indication Field | Repetition factor $K_{PUCCH}$ |
| --- | --- |
| 0 | 8 |
| 1 | 4 |
| 2 | 2 |
| 3 | 1 |

The existing DCI and RNTI
   E.g., the repetition factor of PUCCH can be indicated by the 2 bit TPC command in the DCI format 2-2 with CRC scrambled by TPC-PUCCH-RNTI, a TPC command to repetition factor mapping can be based on the updated table 7.2.1-1 in 38.213 V16.4.0, shown as Table 2 below.

TABLE 2

Mapping of TPC Command Field in a DCI format to accumulated $\delta_{PUCCH,b,f,c}$ values and repetition factor $K_{PUCCH}$ values for PUCCH repetition

| TPC Command Field | Accumulated $\delta_{PUCCH,b,f,c}$ [dB] | Repetition factor $K_{PUCCH}$ |
| --- | --- | --- |
| 0 | −1 | 8 |
| 1 | 0 | 4 |
| 2 | 1 | 2 |
| 3 | 3 | 1 |

In addition to DCI format 2-2 with CRC scrambled by TPC-PUCCH-RNTI, The TPC command can be signaled by other DCI formats, such as DCI format 1_0, 1_1, 1_2, with CRC scrambled by C-RNTI or CS-RNTI or MCS-C-RNTI. Similar TPC command field mapping table can be used.

In addition to Table 2, other variations of the TPC command field can be used, using the principle that the TPC command can indicate jointly the power control information (e.g., accumulated) $\delta_{PUCCHb,f,c}$ and repetition information (e.g., Repetition factor $K_{PUCCH}$)

In one example, the field size of the TPC command is increased to additionally signal the PUCCH repetition factor. For example, instead of 2-bit TPC field command for PUCCH, 3-bit or 4-bit TPC field size can be used to indicate 8 possible combinations of power control info and repetition info for PUCCH. For instance, if 3-bit TPC command, the mapping table can be updated to the following:

TABLE 3

Mapping of TPC Command Field in a DCI format to accumulated $\delta_{PUCCHb,f,c}$ values and repetition factor $K_{PUCCH}$ values for PUCCH repetition

| TPC Command Field | Accumulated $\delta_{PUCCH,b,f,c}$ [dB] | Repetition factor $K_{PUCCH}$ |
| --- | --- | --- |
| 0 | −1 | 1 |
| 1 | 0 | 1 |
| 2 | 1 | 1 |
| 3 | 3 | 1 |
| 4 | −1 | 2 |
| 5 | 0 | 2 |
| 6 | 1 | 4 |
| 7 | 3 | 8 |
| 0 | −1 | 1 |
| 1 | 0 | 1 |

US 12,627,350 B2

29

TABLE 3-continued

Mapping of TPC Command Field in a DCI
format to accumulated $\delta_{PUCCH,b,f,c}$ values
and repetition factor $K_{PUCCH}$ values for PUCCH repetition

| ~~TPC Command Field~~ | ~~Accumulated $\delta_{PUCCH,b,f,c}$ [dB]~~ | ~~Repetition factor $K_{PUCCH}$~~ |
| --- | --- | --- |
| 2 | 1 | 1 |
| 3 | 3 | 1 |
| 4 | −1 | 2 |
| 5 | 0 | 2 |
| 6 | 1 | 4 |
| 7 | 3 | 8 |

In another example, the set of possible combinations of power control info and repetition info for PUCCH is provided by higher layer configuration, i.e., not predefined in a table. The higher configuration can be RRC configuration, or RRC configuration together with MAC CE indication. Furthermore, the TPC command field size can be determined by the total number of combinations J by higher configuration. For instance, the TPC command field size is ceil ($\log_2(J)$).

Advantages of the techniques described herein may include some or all of the following, in various embodiments:

The overhead of periodically reported CSI can be controlled while still allowing good coverage through the use of repetition.

A repetition factor can be dynamically adapted through DCI on PDCCH without additional overhead when a downlink grant is used by configuring a repetition factor within a PUCCH resource.

A repetition factor can be updated with reduced signaling overhead by using a MAC CE that exploits the structure of PUCCH resource set configurations and how PUCCH resources are configured with CSI reporting.

HARQ-ACK can be carried together with periodically reported CSI.

The overhead of the periodically reported CSI can be dynamically reduced to zero through the use of a 'zero' repetition factor. Alternatively, CSI can be transmitted efficiently with HARQ-ACK and only when needed through the use of a downlink grant that triggers a PUCCH transmission that carries both HARQ-ACK and CSI.

PDCCH and/or PDSCH overhead can be avoided by supporting a UL grant to adjust the repetition factor of periodically reported CSI.

Figure 16:
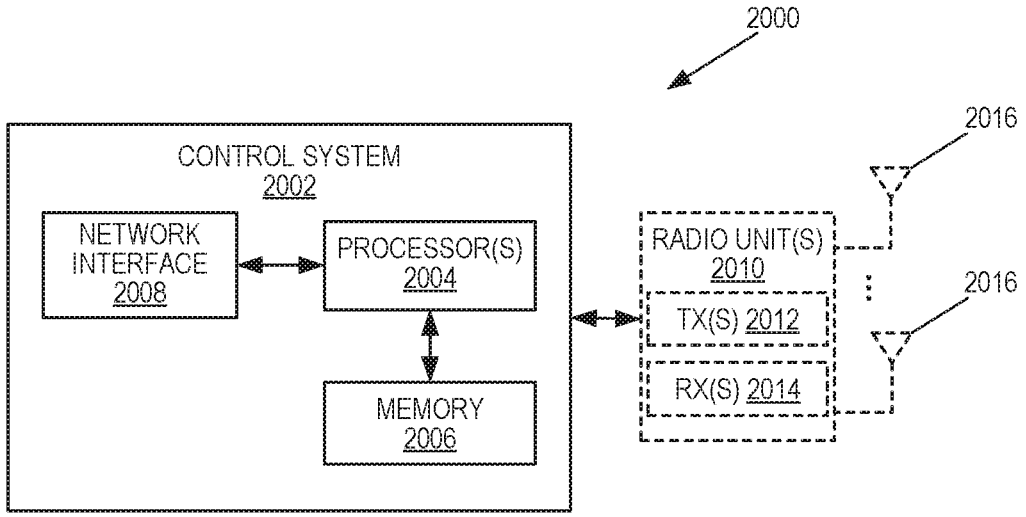
FIG. 16 is a schematic block diagram of a radio access node according to some embodiments of the present disclosure.

FIG. 16 is a schematic block diagram of a radio access node 2000 according to some embodiments of the present disclosure. Optional features are represented by dashed boxes. The radio access node 2000 may be, for example, a base station 702 or 706 or a network node that implements all or part of the functionality of the base station 702 or gNB described herein. As illustrated, the radio access node 2000 includes a control system 2002 that includes one or more processors 2004 (e.g., Central Processing Units (CPUs), Application Specific Integrated Circuits (ASICs), Field Programmable Gate Arrays (FPGAs), and/or the like), memory 2006, and a network interface 2008. The one or more processors 2004 are also referred to herein as processing circuitry. In addition, the radio access node 2000 may include one or more radio units 2010 that each includes one or more transmitters 2012 and one or more receivers 2014 coupled to one or more antennas 2016. The radio units 2010 may be referred to or be part of radio interface circuitry. In

Figure 17:
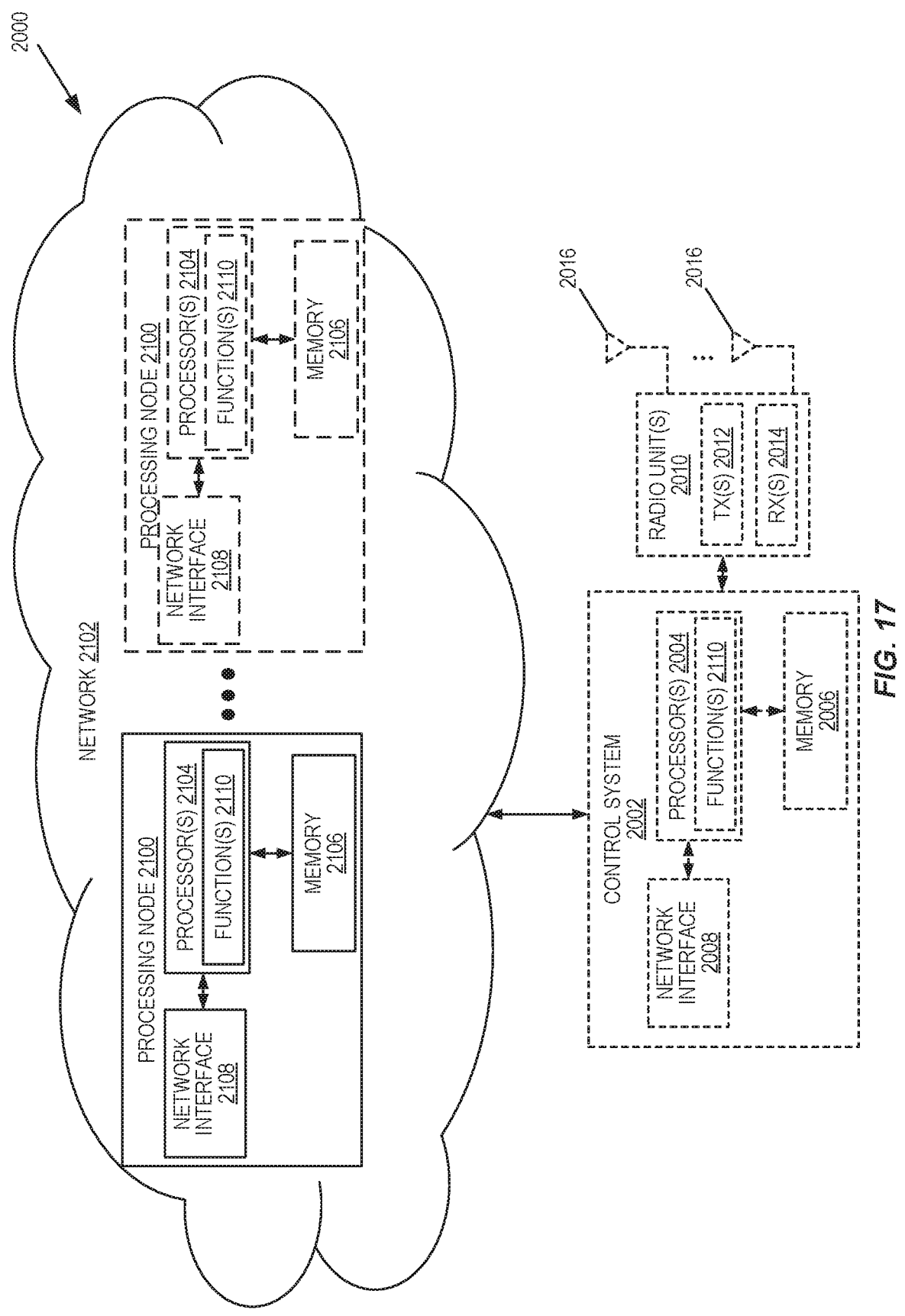
FIG. 17 is a schematic block diagram that illustrates a virtualized embodiment of the radio access node of FIG. 16 according to some embodiments of the present disclosure.

30 some embodiments, the radio unit(s) 2010 is external to the control system 2002 and connected to the control system 2002 via, e.g., a wired connection (e.g., an optical cable). However, in some other embodiments, the radio unit(s) 2010 and potentially the antenna(s) 2016 are integrated together with the control system 2002. The one or more processors 2004 operate to provide one or more functions of a radio access node 2000 as described herein. In some embodiments, the function(s) are implemented in software that is stored, e.g., in the memory 2006 and executed by the one or more processors 2004. FIG. 17 is a schematic block diagram that illustrates a virtualized embodiment of the radio access node 2000 according to some embodiments of the present disclosure. This discussion is equally applicable to other types of network nodes. Further, other types of network nodes may have similar virtualized architectures. Again, optional features are represented by dashed boxes. As used herein, a "virtualized" radio access node is an implementation of the radio access node 2000 in which at least a portion of the functionality of the radio access node 2000 is implemented as a virtual component(s) (e.g., via a virtual machine(s) executing on a physical processing node(s) in a network(s)). As illustrated, in this example, the radio access node 2000 may include the control system 2002 and/or the one or more radio units 2010, as described above. The control system 2002 may be connected to the radio unit(s) 2010 via, for example, an optical cable or the like. The radio access node 2000 includes one or more processing nodes 2100 coupled to or included as part of a network(s) 2102. If present, the control system 2002 or the radio unit(s) are connected to the processing node(s) 2100 via the network 2102. Each processing node 2100 includes one or more processors 2104 (e.g., CPUs, ASICs, FPGAS, and/or the like), memory 2106, and a network interface 2108.

In this example, functions 2110 of the radio access node 2000 described herein are implemented at the one or more processing nodes 2100 or distributed across the one or more processing nodes 2100 and the control system 2002 and/or the radio unit(s) 2010 in any desired manner. In some particular embodiments, some or all of the functions 2110 of the radio access node 2000 described herein are implemented as virtual components executed by one or more virtual machines implemented in a virtual environment(s) hosted by the processing node(s) 2100. As will be appreciated by one of ordinary skill in the art, additional signaling or communication between the processing node(s) 2100 and the control system 2002 is used in order to carry out at least some of the desired functions 2110. Notably, in some embodiments, the control system 2002 may not be included, in which case the radio unit(s) 2010 communicate directly with the processing node(s) 2100 via an appropriate network interface(s).

In some embodiments, a computer program including instructions which, when executed by at least one processor, causes the at least one processor to carry out the functionality of radio access node 2000 or a node (e.g., a processing node 2100) implementing one or more of the functions 2110 of the radio access node 2000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
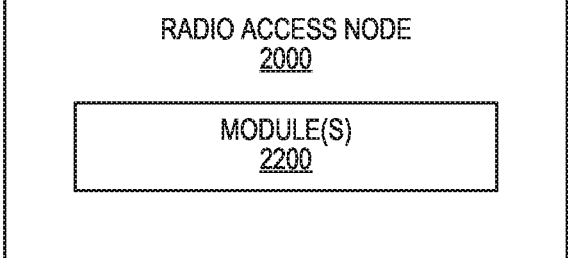
FIG. 18 is a schematic block diagram of the radio access node of FIG. 16 according to some other embodiments of the present disclosure.

FIG. 18 is a schematic block diagram of the radio access node 2000 according to some other embodiments of the present disclosure. The radio access node 2000 includes one or more modules 2200, each of which is implemented in software. The module(s) 2200 provide the functionality of the radio access node 2000 described herein. This discussion is equally applicable to the processing node 2100 of FIG. 17 where the modules 2200 may be implemented at one of the processing nodes 2100 or distributed across multiple processing nodes 2100 and/or distributed across the processing node(s) 2100 and the control system 2002.

Figure 19:
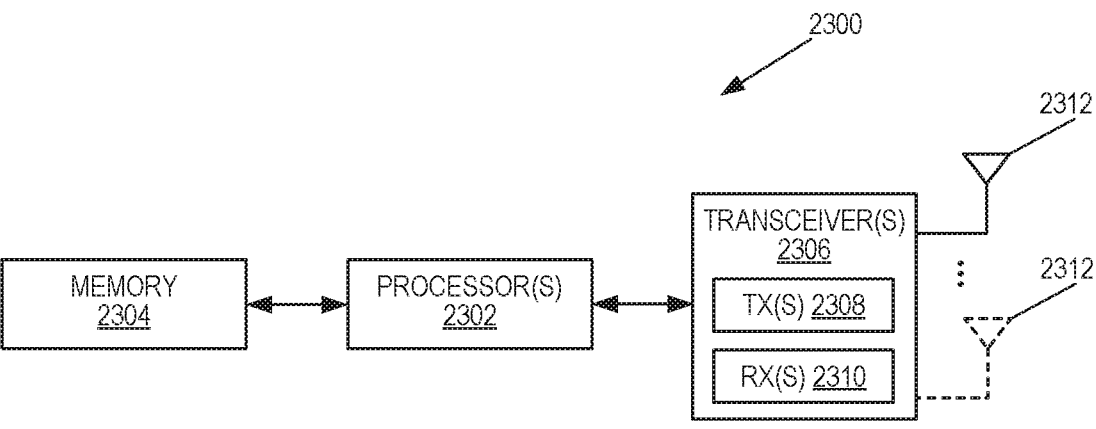
FIG. 19 is a schematic block diagram of a User Equipment device (UE) according to some embodiments of the present disclosure.

FIG. 19 is a schematic block diagram of a wireless communication device 2300 according to some embodiments of the present disclosure. As illustrated, the wireless communication device 2300 includes one or more processors 2302 (e.g., CPUs, ASICs, FPGAs, and/or the like), memory 2304, and one or more transceivers 2306 each including one or more transmitters 2308 and one or more receivers 2310 coupled to one or more antennas 2312. The transceiver(s) 2306 includes radio-front end circuitry connected to the antenna(s) 2312 that is configured to condition signals communicated between the antenna(s) 2312 and the processor(s) 2302, as will be appreciated by on of ordinary skill in the art. The processors 2302 are also referred to herein as processing circuitry. The transceivers 2306 are also referred to herein as radio circuitry. In some embodiments, the functionality of the wireless communication device 2300 described above may be fully or partially implemented in software that is, e.g., stored in the memory 2304 and executed by the processor(s) 2302. Note that the wireless communication device 2300 may include additional components not illustrated in FIG. 19 such as, e.g., one or more user interface components (e.g., an input/output interface including a display, buttons, a touch screen, a microphone, a speaker(s), and/or the like and/or any other components for allowing input of information into the wireless communication device 2300 and/or allowing output of information from the wireless communication device 2300), a power supply (e.g., a battery and associated power circuitry), etc.

In some embodiments, a computer program including instructions which, when executed by at least one processor, causes the at least one processor to carry out the functionality of the wireless communication device 2300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
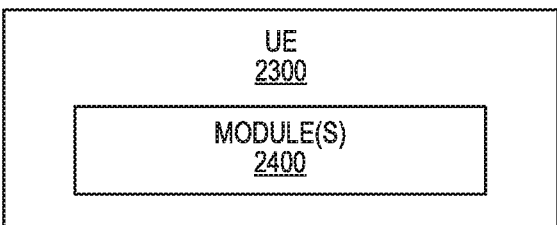
FIG. 20 is a schematic block diagram of the UE of FIG. 19 according to some other embodiments of the present disclosure.

FIG. 20 is a schematic block diagram of the wireless communication device 2300 according to some other embodiments of the present disclosure. The wireless communication device 2300 includes one or more modules 2400, each of which is implemented in software. The module(s) 2400 provide the functionality of the wireless communication device 2300 described herein.

Figure 21:
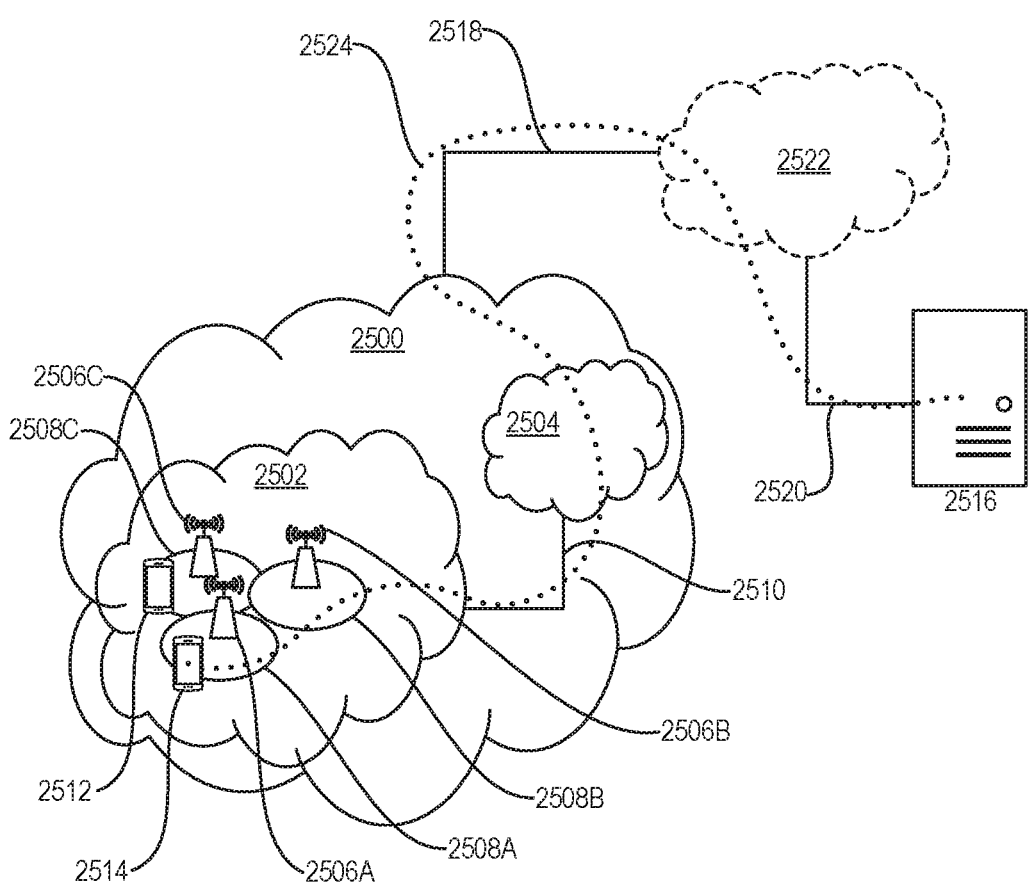
FIG. 21 illustrates a telecommunication network connected via an intermediate network to a host computer in accordance with some embodiments of the present disclosure.

With reference to FIG. 21, in accordance with an embodiment, a communication system includes a telecommunication network 2500, such as a 3GPP-type cellular network, which comprises an access network 2502, such as a RAN, and a core network 2504. The access network 2502 comprises a plurality of base stations 2506A, 2506B, 2506C, such as Node Bs, eNBs, gNBs, or other types of wireless Access Points (APs), each defining a corresponding coverage area 2508A, 2508B, 2508C. Each base station 2506A, 2506B, 2506C is connectable to the core network 2504 over a wired or wireless connection 2510. A first UE 2512 located in coverage area 2508C is configured to wirelessly connect to, or be paged by, the corresponding base station 2506C. A second UE 2514 in coverage area 2508A is wirelessly connectable to the corresponding base station 2506A. While a plurality of UEs 2512, 2514 are illustrated in this example, the disclosed embodiments are equally applicable to a situation where a sole UE is in the coverage area or where a sole UE is connecting to the corresponding base station 2506.

The telecommunication network 2500 is itself connected to a host computer 2516, which may be embodied in the hardware and/or software of a standalone server, a cloud-implemented server, a distributed server, or as processing resources in a server farm. The host computer 2516 may be under the ownership or control of a service provider, or may be operated by the service provider or on behalf of the service provider. Connections 2518 and 2520 between the telecommunication network 2500 and the host computer 2516 may extend directly from the core network 2504 to the host computer 2516 or may go via an optional intermediate network 2522. The intermediate network 2522 may be one of, or a combination of more than one of, a public, private, or hosted network; the intermediate network 2522, if any, may be a backbone network or the Internet; in particular, the intermediate network 2522 may comprise two or more sub-networks (not shown).

The communication system of FIG. 21 as a whole enables connectivity between the connected UEs 2512, 2514 and the host computer 2516. The connectivity may be described as an Over-the-Top (OTT) connection 2524. The host computer 2516 and the connected UEs 2512, 2514 are configured to communicate data and/or signaling via the OTT connection 2524, using the access network 2502, the core network 2504, any intermediate network 2522, and possible further infrastructure (not shown) as intermediaries. The OTT connection 2524 may be transparent in the sense that the participating communication devices through which the OTT connection 2524 passes are unaware of routing of uplink and downlink communications. For example, the base station 2506 may not or need not be informed about the past routing of an incoming downlink communication with data originating from the host computer 2516 to be forwarded (e.g., handed over) to a connected UE 2512. Similarly, the base station 2506 need not be aware of the future routing of an outgoing uplink communication originating from the UE 2512 towards the host computer 2516.

Example implementations, in accordance with an embodiment, of the UE, base station, and host computer discussed in the preceding paragraphs will now be described with reference to FIG. 22. In a communication system 2600, a host computer 2602 comprises hardware 2604 including a communication interface 2606 configured to set up and maintain a wired or wireless connection with an interface of a different communication device of the communication system 2600. The host computer 2602 further comprises processing circuitry 2608, which may have storage and/or processing capabilities. In particular, the processing circuitry 2608 may comprise one or more programmable processors, ASICs, FPGAs, or combinations of these (not shown) adapted to execute instructions. The host computer 2602 further comprises software 2610, which is stored in or accessible by the host computer 2602 and executable by the processing circuitry 2608. The software 2610 includes a host application 2612. The host application 2612 may be operable to provide a service to a remote user, such as a UE 2614 connecting via an OTT connection 2616 terminating at the UE 2614 and the host computer 2602. In providing the service to the remote user, the host application 2612 may provide user data which is transmitted using the OTT connection 2616.

The communication system 2600 further includes a base station 2618 provided in a telecommunication system and comprising hardware 2620 enabling it to communicate with the host computer 2602 and with the UE 2614. The hardware 2620 may include a communication interface 2622 for setting up and maintaining a wired or wireless connection with an interface of a different communication device of the communication system 2600, as well as a radio interface 2624 for setting up and maintaining at least a wireless connection 2626 with the UE 2614 located in a coverage area (not shown in FIG. 22) served by the base station 2618. The communication interface 2622 may be configured to facilitate a connection 2628 to the host computer 2602. The connection 2628 may be direct or it may pass through a core network (not shown in FIG. 22) of the telecommunication system and/or through one or more intermediate networks outside the telecommunication system. In the embodiment shown, the hardware 2620 of the base station 2618 further includes processing circuitry 2630, which may comprise one or more programmable processors, ASICs, FPGAs, or combinations of these (not shown) adapted to execute instructions. The base station 2618 further has software 2632 stored internally or accessible via an external connection.

The communication system 2600 further includes the UE 2614 already referred to. The UE's 2614 hardware 2634 may include a radio interface 2636 configured to set up and maintain a wireless connection 2626 with a base station serving a coverage area in which the UE 2614 is currently located. The hardware 2634 of the UE 2614 further includes processing circuitry 2638, which may comprise one or more programmable processors, ASICs, FPGAs, or combinations of these (not shown) adapted to execute instructions. The UE 2614 further comprises software 2640, which is stored in or accessible by the UE 2614 and executable by the processing circuitry 2638. The software 2640 includes a client application 2642. The client application 2642 may be operable to provide a service to a human or non-human user via the UE 2614, with the support of the host computer 2602. In the host computer 2602, the executing host application 2612 may communicate with the executing client application 2642 via the OTT connection 2616 terminating at the UE 2614 and the host computer 2602. In providing the service to the user, the client application 2642 may receive request data from the host application 2612 and provide user data in response to the request data. The OTT connection 2616 may transfer both the request data and the user data. The client application 2642 may interact with the user to generate the user data that it provides.

Figure 22:
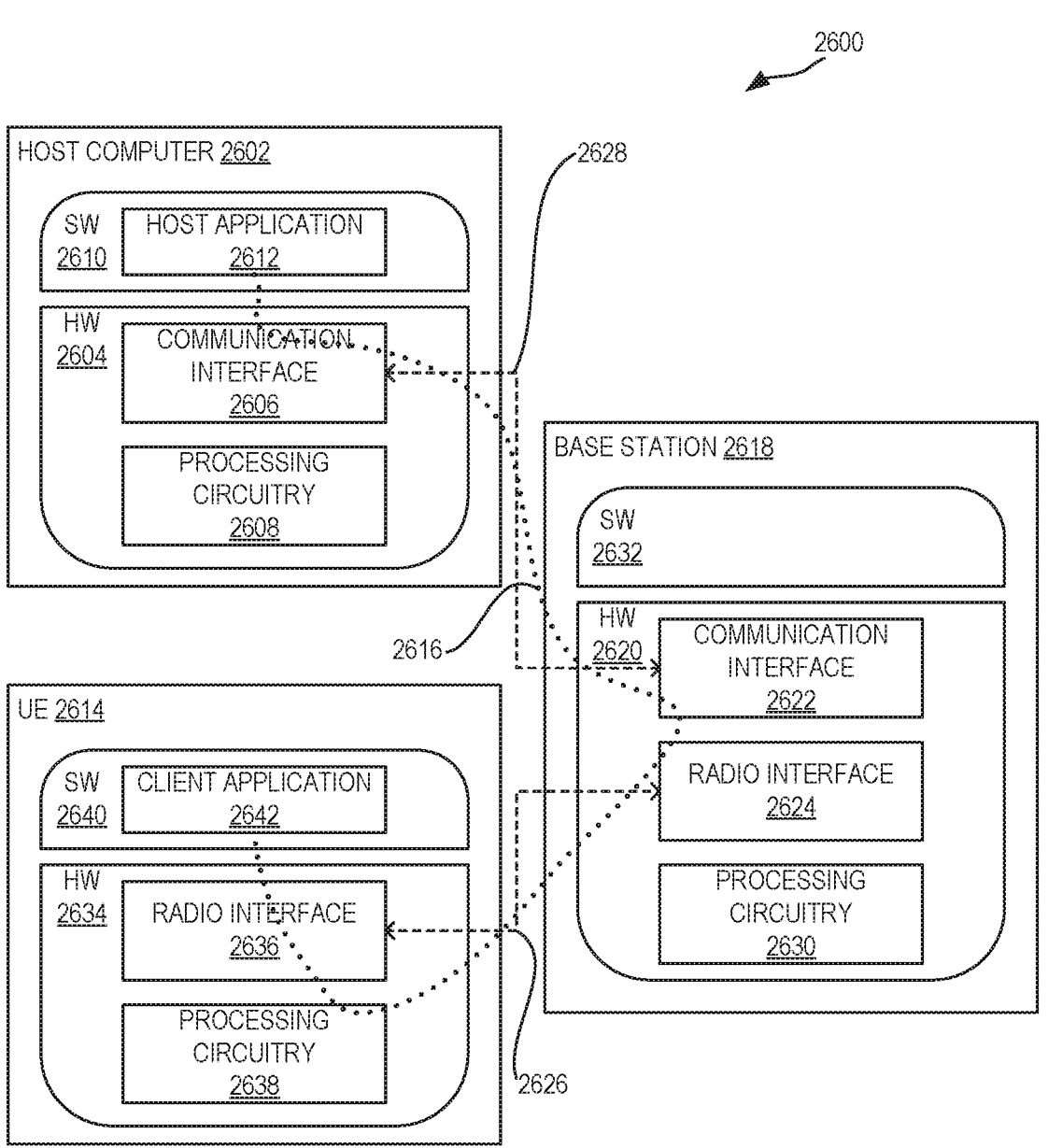
FIG. 22 is a generalized block diagram of a host computer communicating via a base station with a UE over a partially wireless connection in accordance with some embodiments of the present disclosure.

It is noted that the host computer 2602, the base station 2618, and the UE 2614 illustrated in FIG. 22 may be similar or identical to the host computer 2516, one of the base stations 2506A, 2506B, 2506C, and one of the UEs 2512, 2514 of FIG. 21, respectively. This is to say, the inner workings of these entities may be as shown in FIG. 22 and independently, the surrounding network topology may be that of FIG. 21.

In FIG. 22, the OTT connection 2616 has been drawn abstractly to illustrate the communication between the host computer 2602 and the UE 2614 via the base station 2618 without explicit reference to any intermediary devices and the precise routing of messages via these devices. The network infrastructure may determine the routing, which may be configured to hide from the UE 2614 or from the service provider operating the host computer 2602, or both. While the OTT connection 2616 is active, the network infrastructure may further take decisions by which it dynamically changes the routing (e.g., on the basis of load balancing consideration or reconfiguration of the network).

The wireless connection 2626 between the UE 2614 and the base station 2618 is in accordance with the teachings of the embodiments described throughout this disclosure. One or more of the various embodiments improve the performance of OTT services provided to the UE 2614 using the OTT connection 2616, in which the wireless connection 2626 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2616 between the host computer 2602 and the UE 2614, in response to variations in the measurement results. The measurement procedure and/or the network functionality for reconfiguring the OTT connection 2616 may be implemented in the software 2610 and the hardware 2604 of the host computer 2602 or in the software 2640 and the hardware 2634 of the UE 2614, or both. In some embodiments, sensors (not shown) may be deployed in or in association with communication devices through which the OTT connection 2616 passes; the sensors may participate in the measurement procedure by supplying values of the monitored quantities exemplified above, or supplying values of other physical quantities from which the software 2610, 2640 may compute or estimate the monitored quantities. The reconfiguring of the OTT connection 2616 may include message format, retransmission settings, preferred routing, etc.; the reconfiguring need not affect the base station 2618, and it may be unknown or imperceptible to the base station 2618. Such procedures and functionalities may be known and practiced in the art. In certain embodiments, measurements may involve proprietary UE signaling facilitating the host computer's 2602 measurements of throughput, propagation times, latency, and the like. The measurements may be implemented in that the software 2610 and 2640 causes messages to be transmitted, in particular empty or 'dummy' messages, using the OTT connection 2616 while it monitors propagation times, errors, etc.

Figures 23, 24:
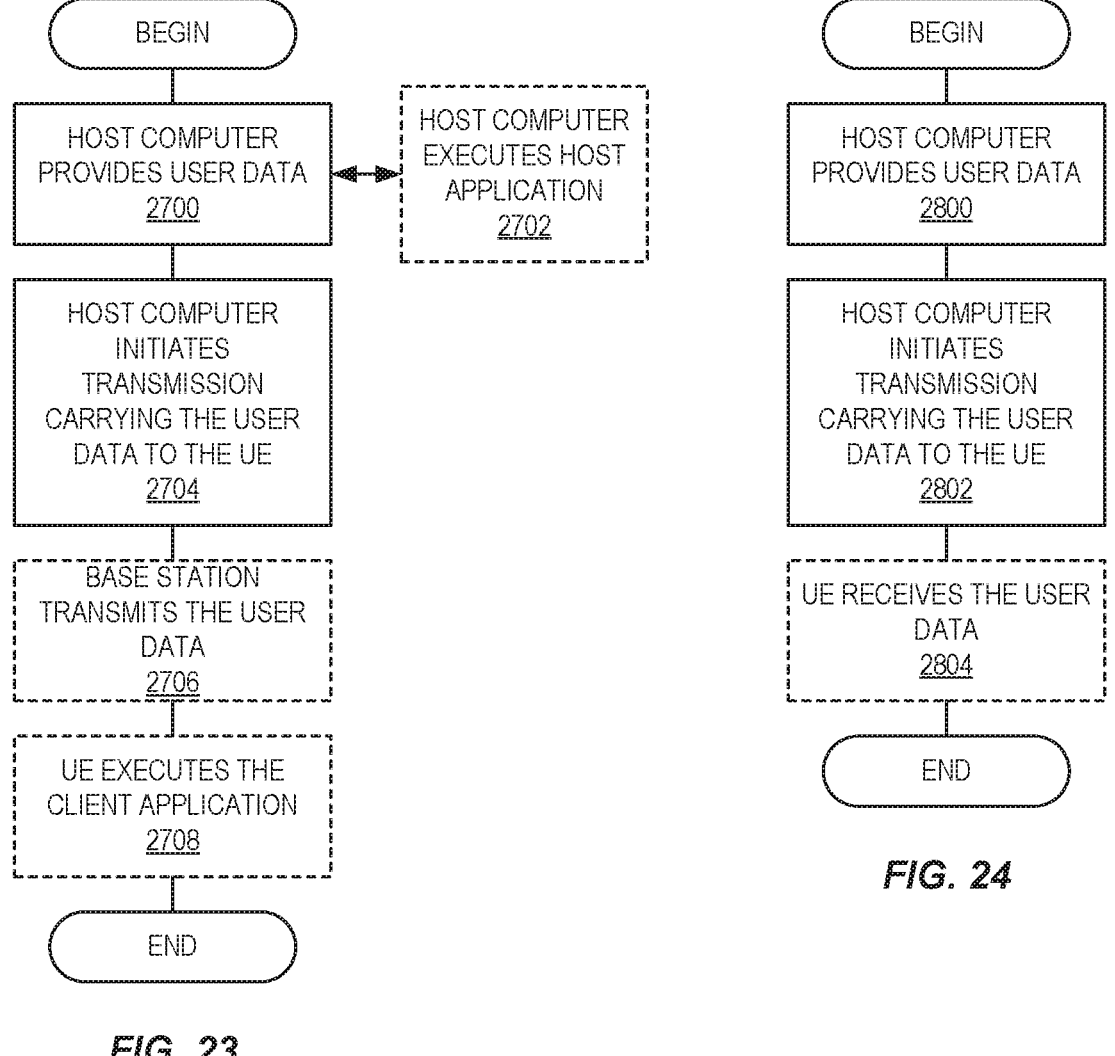
FIG. 23 is a flowchart illustrating a method implemented in a communication system in accordance with one embodiment of the present disclosure.
FIG. 24 is a flowchart illustrating a method implemented in a communication system in accordance with one embodiment of the present disclosure.

FIG. 23 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 23 will be included in this section. In step 2700, the host computer provides user data. In sub-step 2702 (which may be optional) of step 2700, the host computer provides the user data by executing a host application. In step 2704, the host computer initiates a transmission carrying the user data to the UE. In step 2706 (which may be optional), the base station transmits to the UE the user data which was carried in the transmission that the host computer initiated, in accordance with the teachings of the embodiments described throughout this disclosure. In step 2708 (which may also be optional), the UE executes a client application associated with the host application executed by the host computer.

FIG. 24 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 24 will be included in this section. In step 2800 of the method, the host computer provides user data. In an optional sub-step (not shown) the host computer provides the user data by executing a host application. In step 2802, the host computer initiates a transmission carrying the user data to the UE. The transmission may pass via the base station, in accordance with the teachings of the embodiments described throughout this disclosure. In step 2804 (which may be optional), the UE receives the user data carried in the transmission.

Figures 25, 26:
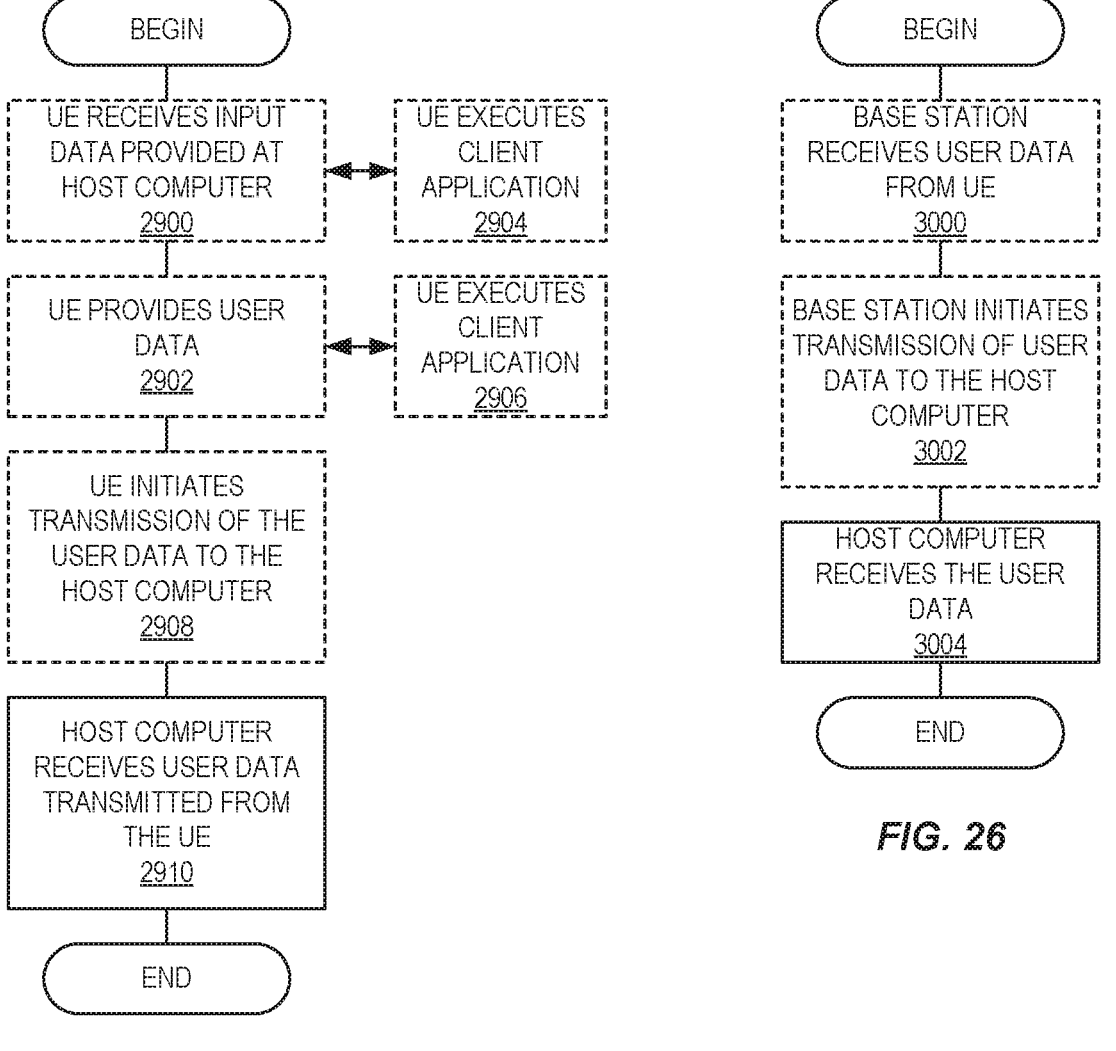
FIG. 25 is a flowchart illustrating a method implemented in a communication system in accordance with one embodiment of the present disclosure.
FIG. 26 is a flowchart illustrating a method implemented in a communication system in accordance with one embodiment of the present disclosure.

FIG. 26 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 25 will be included in this section. In step 2900 (which may be optional), the UE receives input data provided by the host computer. Additionally or alternatively, in step 2902, the UE provides user data. In sub-step 2904 (which may be optional) of step 2900, the UE provides the user data by executing a client application. In sub-step 2906 (which may be optional) of step 2902, the UE executes a client application which provides the user data in reaction to the received input data provided by the host computer. In providing the user data, the executed client application may further consider user input received from the user. Regardless of the specific manner in which the user data was provided, the UE initiates, in sub-step 2908 (which may be optional), transmission of the user data to the host computer. In step 2910 of the method, the host computer receives the user data transmitted from the UE, in accordance with the teachings of the embodiments described throughout this disclosure.

FIG. 26 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 26 will be included in this section. In step 3000 (which may be optional), in accordance with the teachings of the embodiments described throughout this disclosure, the base station receives user data from the UE. In step 3002 (which may be optional), the base station initiates transmission of the received user data to the host computer. In step 3004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| ACK | Acknowledgement |
| AF | Application Function |
| AMF | Access and Mobility Function |
| AN | Access Network |
| AP | Access Point |
| ASIC | Application Specific Integrated Circuit |
| AUSF | Authentication Server Function |
| BS | Base station |
| CB | Code Block |
| CBG | Code Block Group |
| CBGTI | Code Block Group Transmission Information |
| CG | Configured Grant |
| CRC | Cyclic Redundancy Check |
| CRM | Contention Resolution Message |
| CSI | Channel State Information |
| DCI | Downlink Control Information |
| DL | Downlink |
| DM-RS | Demodulation Reference Signal |
| FH | Frequency Hopping |
| FR1 | Frequency Range 1 |
| FR2 | Frequency Range 2 |
| gNB | Network Node in NR |
| HARQ | Hybrid Automated Retransmission Request |
| HARQ-ACK | Hybrid Automated Retransmission Request Acknowlegment |
| MAC | Medium Access Control |
| Msg3 | Message 3 |
| NR | New Radio |
| PRI | Physical Uplink Control Channel Resource Indication |
| PDCCH | Physical Downlink Control Channel |
| PUCCH | Physical Uplink Control Channel |
| PUSCH | Physical Uplink Shared Data Channel |
| PRACH | Physical Random Access Channel |
| PRB | Physical Resource Block, i.e., 12 consecutive subcarriers |
| RACH | Random Access Channel |
| RE | Resource Element |
| RNTI | Radio Network Temporary Indentifier |
| RSRP | Reference Signal Received Power |
| RV | Redundancy Version |
| TB | Transport Block |
| TBS | Transport Block Size |
| TxD | Transmit Diversity |
| UCI | Uplink Control Informatio |
| UE | User Equipment |
| UL | Uplink |
| UPF | User Plane Function |

Those skilled in the art will recognize improvements and modifications to the embodiments of the present disclosure. All such improvements and modifications are considered within the scope of the concepts disclosed herein.

What is claimed is:

1. A method performed by a wireless device for reporting Channel State Information (CSI), the method comprising:

receiving signaling identifying a plurality of time instants in which the wireless device may transmit distinct CSI reports;

receiving signaling identifying a set of one or more resources to be used to transmit a physical channel carrying CSI reports;

receiving control signaling that identifies a resource in the set of resources, wherein the control signaling indicates a repetition factor for repetitively transmitting a CSI report, either by association with the resource identified by the control signaling or by a distinct indicator included in the control signaling; and transmitting the CSI report on the identified resource, according to the repetition factor and in a time instant of the plurality of time instants.

2. The method of claim 1, wherein the control signaling is a medium access control control element (MAC CE), and the resource is identified in the MAC CE with a field conveying an index identifying the set of resources among a plurality of sets of resources configured to the UE and a field conveying an index of the resource identifying the resource among the resources in the set of resources.

3. The method of claim 1, wherein the control signaling is a medium access control control element (MAC CE), and the wireless device determines one of a subset of the set of resources, where the subset is configured for use within a periodic reporting configuration, the resource configuration for at least one resource of the subset comprises a repetition factor, and the selected resource is the identified resource.

4. The method of claim 1, wherein the control signaling is downlink control information (DCI), and wherein the method further comprises one of:

determining one of a subset of the set of resources, where the subset is configured for use within a periodic reporting configuration, the resource configuration for at least one resource of the subset comprises a repetition factor, and the selected resource is the identified resource, and determining a repetition factor of a set of repetition factors associated with the resource as the repetition factor.

5. The method of claim 4, wherein the method further comprises transmitting a plurality of distinct CSI reports using the resource and according to the repetition factor, in subsequent ones of the plurality of time instants.

6. The method of claim 2, wherein transmitting according to the repetition factor comprises not transmitting on the identified resource in the time instant when the repetition factor is a first value and transmitting on the identified resource in the time instant when the repetition factor is a value other than the first value.

7. The method of claim 1, wherein the method further comprises additionally transmitting HARQ-ACK on the identified resource according to the repetition factor when HARQ-ACK is to be transmitted in the time instant.

8. The method of claim 1, wherein the method further comprises:

transmitting the CSI report once according to the repetition factor, wherein the transmission in response to the DCI is comprised in only the time instant of the plurality of time instants; and additionally transmitting HARQ-ACK in response to a downlink physical channel indicated by the DCI.

9. The method of claim 1, wherein downlink control information (DCI) indicates resources to be used for a physical uplink shared channel (PUSCH) transmission in a different time instant of the plurality of time instants, and wherein the method further comprises:

when the repetition factor corresponds to transmitting the physical channel once, transmitting a physical uplink shared channel (PUSCH) in response to the DCI and that carries the CSI report when the PUSCH is to be transmitted in the different time instant; and when the repetition factor corresponds to transmitting the CSI more than once, transmitting the CSI report on the identified resource, according to the repetition factor, and in the different time instant.

10. A wireless device for reporting Channel State Information (CSI), the wireless device comprising:

one or more processors; and memory storing instructions executable by the one or more processors, whereby the wireless device is operable to:

receive signaling identifying a plurality of time instants in which the wireless device may transmit distinct CSI reports;

receive signaling identifying a set of one or more resources to be used to transmit a physical channel carrying CSI reports;

receive control signaling that identifies a resource in the set of resources, wherein the control signaling indicates a repetition factor for repetitively transmitting a CSI report, either by association with the resource identified by the control signaling or by a distinct indicator included in the control signaling; and transmit the CSI report on the identified resource, according to the repetition factor and in a time instant of the plurality of time instants.

11. A method performed by a network node for obtaining Channel State Information (CSI), the method comprising:

sending, to a wireless device, signaling identifying a plurality of time instants in which the wireless device may transmit distinct CSI reports;

sending, to the wireless device, signaling identifying a set of one or more resources to be used to transmit a physical channel carrying CSI reports;

sending, to the wireless device, control signaling that identifies a resource in the set of resources, wherein the control signaling indicates a repetition factor for repetitively transmitting a CSI report, either by association with the resource identified by the control signaling or by a distinct indicator included in the control signaling; and receiving the CSI report on the identified resource, according to the repetition factor and in a time instant of the plurality of time instants.

12. The method of claim 11, wherein the control signaling is a medium access control control element (MAC CE), and the resource is identified in the MAC CE with a field conveying an index identifying the set of resources among a plurality of sets of resources configured to the UE and a field conveying an index of the resource identifying the resource among the resources in the set of resources.

13. The method of claim 11, wherein the control signaling is a medium access control control element (MAC CE), and the wireless determines one of a subset of the set of resources, where the subset is configured for use within a periodic reporting configuration, the resource configuration for at least one resource of the subset comprises a repetition factor, and the selected resource is the identified resource.

14. The method of claim 11, wherein the control signaling is downlink control information (DCI) and wherein the method further comprises one of:

determining one of a subset of the set of resources, where the subset is configured for use within a periodic reporting configuration, the resource configuration for at least one resource of the subset comprises a repetition factor, and the selected resource is the identified resource, and determining a repetition factor of a set of repetition factors associated with the resource as the repetition factor.

15. The method of claim 14, wherein the method further comprises receiving a plurality of distinct CSI reports using the resource and according to the repetition factor, in subsequent ones of the plurality of time instants.

16. The method of claim 15, wherein receiving according to the repetition factor comprises not receiving on the identified resource in the time instant when the repetition factor is a first value and receiving on the identified resource in the time instant when the repetition factor is a value other than the first value.

17. The method of claim 11, wherein the method further comprises additionally receiving HARQ-ACK on the identified resource according to the repetition factor when HARQ-ACK is to be received in the time instant.

18. The method of claim 11, wherein the method further comprises:

receiving the CSI report once according to the repetition factor, wherein a transmission by the wireless device in response to the DCI is comprised in only the time instant of the plurality of time instants; and additionally receiving HARQ-ACK in response to indicating a downlink physical channel by the DCI.

19. A network node for reporting Channel State Information (CSI), the network node comprising:

one or more processors; and memory storing instructions executable by the one or more processors, whereby the network node is operable to:

send, to a wireless device, signaling identifying a plurality of time instants in which the wireless device may transmit distinct CSI reports;

send, to the wireless device, signaling identifying a set of one or more resources to be used to transmit a physical channel carrying CSI reports;

send, to the wireless device, control signaling that identifies a resource in the set of resources, wherein the control signaling indicates a repetition factor for repetitively transmitting a CSI report, either by association with the resource identified by the control signaling or by a distinct indicator included in the control signaling; and receive the CSI report on the identified resource, according to the repetition factor and in a time instant of the plurality of time instants.

* * * * *